United States Patent
Xiao et al.

(10) Patent No.: US 11,790,550 B2
(45) Date of Patent: Oct. 17, 2023

(54) LEARNABLE COST VOLUME FOR DETERMINING PIXEL CORRESPONDENCE

(71) Applicant: Google LLC

(72) Inventors: Taihong Xiao, Merced, CA (US); Deqing Sun, Cambridge, MA (US); Ming-Hsuan Yang, Cupertino, CA (US); Qifei Wang, Sunnyvale, CA (US); Jinwei Yuan, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 305 days.

(21) Appl. No.: 17/292,647

(22) PCT Filed: Jul. 8, 2020

(86) PCT No.: PCT/US2020/041258
§ 371 (c)(1),
(2) Date: May 10, 2021

(87) PCT Pub. No.: WO2022/010476
PCT Pub. Date: Jan. 13, 2022

(65) Prior Publication Data
US 2022/0189051 A1 Jun. 16, 2022

(51) Int. Cl.
*G06K 9/00* (2022.01)
*G06T 7/593* (2017.01)
*G06T 7/215* (2017.01)

(52) U.S. Cl.
CPC ............ *G06T 7/593* (2017.01); *G06T 7/215* (2017.01); *G06T 2207/10012* (2013.01); *G06T 2207/20081* (2013.01)

(58) Field of Classification Search
CPC ............... G06T 7/593; G06T 7/215; G06T 2207/10012; G06T 2207/20081
(Continued)

(56) References Cited

PUBLICATIONS

Truong, Prune, et al. "GOCor: Bringing globally optimized correspondence volumes into your neural network." Advances in Neural Information Processing Systems 33 (2020): 14278-14290. (Year: 2020).*

(Continued)

*Primary Examiner* — Jonathan S Lee
(74) *Attorney, Agent, or Firm* — McDonnell Boehnen Hulbert & Berghoff LLP

(57) ABSTRACT

A method includes obtaining a first plurality of feature vectors associated with a first image and a second plurality of feature vectors associated with a second image. The method also includes generating a plurality of transformed feature vectors by transforming each respective feature vector of the first plurality of feature vectors by a kernel matrix trained to define an elliptical inner product space. The method additionally includes generating a cost volume by determining, for each respective transformed feature vector of the plurality of transformed feature vectors, a plurality of inner products, wherein each respective inner product of the plurality of inner products is between the respective transformed feature vector and a corresponding candidate feature vector of a corresponding subset of the second plurality of feature vectors. The method further includes determining, based on the cost volume, a pixel correspondence between the first image and the second image.

20 Claims, 11 Drawing Sheets

(58) Field of Classification Search
USPC ......................................................... 382/106
See application file for complete search history.

(56) References Cited

PUBLICATIONS

Dickscheid, Timo. Robust Wide-Baseline Stereo Matching for Sparsely Textured Scenes. Diss. Bonn, Univ., Diss., 2011, 2013. (Year: 2011).*
Lim, Jaeseung, and Sankeun Lee. "Patchmatch-based robust stereo matching under radiometric changes." IEEE transactions on pattern analysis and machine intelligence 41.5 (2018): 1203-1212. (Year: 2018).*
Liu, Hongmin, and Zhiheng Wang. "Robust irregular region matching based on inner product and exterior product." The 2010 IEEE International Conference on Information and Automation. IEEE, 2010. (Year: 2010).*
Gunn, Charles, "On the Homogeneous Model of Euclidean Geometry," Section 3.1 The Cayley-Klein Construction, Cornell University Library, aiXiv:1101.4542c3 [math.MG] Mar. 12, 2011, 55 pages.
International Searching Authority, International Search Report and Written Opinion dated Mar. 12, 2021, issued in connection with International Patent Application No. PCT/US2020/041258, filed on Jul. 8, 2020, 14 pages.
Jiang et al., "Static-Map and Dynamic Object Reconstruction in Outdoor Scenes Using 3-D Motion Segmentation," IEEE Robotics and Automation Letters, Jan. 2016, pp. 324-331, vol. 1, No. 1.
Absil et al., "Optimization Algorithms on Matrix Manifolds," Princeton University Press, 2007, 241 pages.
Bao et al., "Depth-aware Video Frame Interpolation," IEEE Conference on Computer Vision and Pattern Recognition (CVPR), arXiv:1904.00830V1, Apr. 1, 2019, 11 pages.
Butler et al., "A Naturalistic Open Source Movie for Optical Flow Evaluation," European Conference on Computer Vision (ECCV), Part VI, LNCS 7577, 2012, pp. 611-625.
Cheng et al., "Segflow: Joint Learning for Video Object Segmentation and Optical Flow," IEEE International Conference on Computer Vision (ICCV), ARxIV:1709.06750V1, 2017, 10 pages.
Dosovitskiy et al., "FlowNet: Learning Optical Flow with Convolutional Networks," 2015 IEEE International Conference on Computer Vision (ICCV), 2015, pp. 2758-2766.
Gatys et al., "Image Style Transfer Using Convolutional Neural Networks," IEEE Conference on Computer Vision and Pattern Recognition (CVPR), 2016, pp. 2414-2423.
Hafner et al., "Why is the Census Transform Good for Robust Optic Flow Computation?" International Conference an Scale Space and Variational Methods in Computer Vision (SSVM), Lecture Notes in Computer Science, 2013, pp. 210-221, vol. 7893.
Horn et al., "Determining Optical Flow," Artificial Intelligence, 1981, pp. 185-203, vol. 17, No. 1-3.
Hui et al., LiteFlowNet: A Lightweight Convolutional Neural Network for Optical Flow Estimation, IEEE Conference on Computer Vision and Pattern Recognition (CVPR), arXiv:1805.07046v1, May 18, 2018, 11 pages.
Hur et al., MirrorFlow: Exploiting Symmetries in Joint Optical Flow and Occlusion Estimation, IEEE International Conference on Computer Vision (ICCV), 2017, pp. 312-321.
Hur et al., Iterative Residual Refinement for Joint Optical Flow and Occlusion Estimation, IEEE Conference on Computer Vision and Pattern Recognition (CVPR), arXiv:1904.05290v1, 2019, 15 pages.
Ilg et al., FlowNet 2.0: Evolution of Optical Flow Estimation with Deep Networks, IEEE Conference on Computer Vision and Pattern Recognition (CVPR), arXiv:1612.01925v1, 2017, 16 pages.
Janai et al., "Unsupervised Learning of Multi-Frame Optical Flow with Occlusions," European Conference on Computer Vision (ECCV), 2018, 17 pages.

Kendall et al., "End-to-End Learning of Geometry and Context for Deep Stereo Regression," IEEE International Conference on Computer Vision (ICCV), arXiv:1703.04309v1, Mar. 13, 2017, 10 pages.
Li et al., "Universal Style Transfer Via Feature Transforms," Neural Information Processing Systems (NeurIPS), arXiv:1705.080862, Nov. 17, 2017, 11 pages.
Li et al., "Flow-Grounded Spatial-Temporal Video Prediction from Still Images," European Conference on Computer Vision (ECCV), arXiv:1807.09755V2, 2018, 18 pages.
Lin et al., "TSM: Temporal Shift Module for Efficient Video Understanding," IEEE International Conference on Computer Vision (ICCV), arXiv:1811.08383v3, 2019, 13 pages.
Liu et al., "DDFlow: Learning Optical Flow with Unlabeled Data Distillation," Association for the Advancement of Artificial Intelligence (AAAI), arXiv:1902.09145, 2019, 8 pages.
Liu et al., "SelFlow: Self-Supervised Learning of Optical Flow," IEEE Conference on Computer Vision and Pattern Recognition (CVPR), arXiv:1904.09117v1, 2019, 14 pages.
Mayer et al., "A Large Dataset to Train Convolutional Networks for Disparity, Optical Flow, and Scene Flow Estimation," IEEE Conference on Computer Vision and Pattern Recognition (CVPR), arXiv:1512.02134v1, 2015, 14 pages.
Weister et al., "Unflow: Unsupervised Learning of Optical Flow with a Bidirectional Census Loss," Association for the Advancement of Artificial Intelligence (AAAI), arXiv:1711.07837v1, 2017, 9 pages.
Wenze et al., "Joint 3D Estimation of Vehicles and Scene Flow," ISPRS Annals of the Photogrammetry, Remote Sensing and Spatial Information Sciences, 2015, 8 pages, vol. II-3/W5.
Menze et al., "Object Scene Flow," ISPRS Journal of Photogrammetry and Remote Sensing (JPRS), 2018, 47 pages.
Ranjan et al., "Optical Flow Estimation using a Spatial Pyramid Network," IEEE Conference on Computer Vision and Pattern Recognition (CVPR), arXiv:1611.00850v2, 2017, 10 pages.
Ranjan et al., "Attacking Optical Flow," IEEE International Conference on Computer Vision (ICCV), arXiv:1910.10053.v1, 2019, 21 pages.
Ren et al., "Unsupervised Deep Learning for Optical Flow Estimation," Proceedings of the Thirty-First AAAI Conference on Artificial Intelligence (AAAI-17), 2017, pp. 1495-1501.
Scharstein et al., "A Taxonomy and Evaluation of Dense Two-Frame Stereo Correspondence Algorithms," International Journal on Computer Vision (IJCV), 2002, 35 pages, vol. 47, No. 1-3.
Sun et al., "PWC-Net: CNNs for Optical Flow Using Pyramid, Warping, and Cost Volume," IEEE Conference on Computer Vision and Pattern Recognition (CVPR), arXiv:1709.02371v3, 2018, 18 pages.
Sun et al., "Models Matter, So Does Training: An Empirical Study of CNNs for Optical Flow Estimation," IEEE Transactions on Pattern Recognition and Machine Intelligence (PAMI), arXiv:1809.05571v1, 2019, 15 pages.
Szeliski, Richard, Computer Vision: Algorithms and Applications, Springer Science & Business Media, 2010, 979 pages.
Tsai et al., "Video Segmentation via Object Flow," IEEE Conference on Computer Vision and Pattern Recognition (CVPR), 2016, pp. 3899-3908.
Wang et al., "Occlusion Aware Unsupervised Learning of Optical Flow," IEEE Conference on Computer Vision and Pattern Recognition (CVPR), arXiv:1711.05890v2, 2017, 10 pages.
Xiao et al., "Learnable Cost Volume Using the Cayley Representation," Computer Vision and Pattern Recognition, arXiv:2007.11431v1, Jul. 21, 2020, 24 pages.
Xu et al., "Accurate Optical Flow via Direct Cost Volume Processing," IEEE Conference on Computer Vision and Pattern Recognition (CVPR), arXiv:1704.07325v1, 2017, 9 pages.
Yang et al., "Volumetric Correspondence Networks for Optical Flow," 33rd Conference on Neural Information Processing Systems (NeurIPS), 2019, 12 pages.
Yin et al., "Hierarchical Discrete Distribution Decomposition for Match Density Estimation," IEEE Conference on Computer Vision and Pattern Recognition (CVPR), arXiv:1812.062643v3, 2019, 10 pages.

(56) References Cited

PUBLICATIONS

Yin et al., "GeoNet: Unsupervised Learning of Dense Depth, Optical Flow and Camera Pose," IEEE Conference on Computer Vision and Pattern Recognition (CVPR), arXiv:1803.02276v2, 2018, 10 pages.
Yu, Jason J. et al., "Back to Basics: Unsupervised Learning of Optical Flow via Brightness Constancy and Motion Smoothness," European Conference on Computer Vision (ECCV), arXiv:1608.05842v1, 2016, 4 pages.
Žbontar et al., "Stereo Matching by Training a Convolutional Neural Network to Compare Image Patches," Journal of Machine Learning Research (JMLR), 2016, pp. 1-32, vol. 17.
Zou et al., DF-Net: Unsupervised Joint Learning of Depth and Flow using Cross-Task Consistency, European Conference on Computer Vision (ECCV), arXiv:1809.01649v1, 2018, 18 pages.

\* cited by examiner

| Methods | Sintel | | | | | | KITTI 2015 | | |
| --- | --- | --- | --- | --- | --- | --- | --- | --- | --- |
| | Clean | | Final | | AEPE | | Fl-all (%) | | |
| | Train | Test | Train | Test | Train | | Train | | Test |
| FlowNet2 | 2.02 | 3.96 | 3.14 | 6.02 | 10.06 | | 30.37 | | - |
| FlowNet2-ft | (1.45) | 4.16 | (2.01) | 5.74 | (2.30) | | (8.61) | | 10.41 |
| DCFlow | - | 3.54 | - | 5.12 | - | | 15.09 | | 14.83 |
| MirrorFlow | - | - | - | 6.07 | - | | 9.93 | | 10.29 |
| SpyNet | 4.12 | 6.69 | 5.57 | 8.43 | - | | - | | - |
| SpyNet-ft | (3.17) | 6.64 | (4.32) | 8.36 | - | | - | | 35.07 |
| LiteFlowNet | 2.52 | - | 4.05 | 10.39 | - | | - | | - |
| LiteFlowNet+ft | (1.64) | 4.86 | (2.23) | 6.09 | (2.16) | | - | | 10.24 |
| PWC-Net | 2.55 | - | 3.93 | - | 10.35 | | 33.67 | | - |
| PWC-Net-ft | (2.02) | 4.39 | (2.08) | 5.04 | (2.16) | | (9.80) | | 9.60 |
| PWC-Net+-ft | (1.71) | 3.45 | (2.34) | 4.60 | (1.50) | | (5.30) | | 7.72 |
| IRR-PWC-ft | (1.92) | 3.84 | (2.51) | 4.58 | (1.63) | | (5.30) | | 7.65 |
| HD³ | 3.84 | - | 8.77 | - | 13.17 | | 23.99 | | - |
| HD³-ft | (1.70) | 4.79 | (1.17) | 4.67 | (1.31) | | (4.10) | | 6.55 |
| VCN | 2.21 | - | 3.62 | - | 8.36 | | 25.10 | | 8.73 |
| VCN-ft | (1.66) | 2.81 | (2.24) | 4.40 | (1.16) | | (4.10) | | 6.30 |
| VCN+LCV | (1.62) | 2.83 | (2.22) | 4.20 | (1.13) | | (3.80) | | 6.25 |

Figure 8A

| KITTI 2015 | | | | | |
|---|---|---|---|---|---|
| | Train | | Test | | |
| Methods | AEPE | Fl-bg (%) | Fl-fg (%) | Fl-all (%) | |
| DSTFlow | 16.79 | - | - | 39 | |
| GeoNet | 10.81 | - | - | - | |
| UnFlow | 8.88 | - | - | 28.95 | |
| DF-Net | 7.45 | - | - | 22.82 | |
| OccAwareFlow | 8.88 | - | - | 31.2 | |
| Back2FutureFlow | 6.59 | 22.67 | 34.27 | 22.94 | |
| SelFlow | 4.84 | 12.68 | 21.74 | 14.19 | |
| DDFlow | 5.72 | 13.08 | 20.40 | 14.29 | |
| DDFlow+LCV | 5.15 | 12.98 | 19.83 | 14.12 | |

Figure 8B

LEARNABLE COST VOLUME FOR DETERMINING PIXEL CORRESPONDENCE

CROSS-REFERENCE TO RELATED APPLICATIONS

The present application is a National Stage Application under 35 U.S.C. § 371 and claims priority to International Patent Application No. PCT/US2020/041258, filed Jul. 8, 2020, and titled "Learnable Cost Volume for Determining Pixel Correspondence," which is incorporated herein by reference in its entirety.

BACKGROUND

A pixel correspondence between two images may indicate how pixels in a first image relate to pixels in a second image. The first image and the second image may be captured at different times and/or from different perspectives, and may thus provide different representations of an environment. A pair of pixels mapped to one another may represent the same portion of the environment, thus indicating an apparent displacement of the portion of the environment relative to the camera over time and/or due to the different perspectives of the images. Pixel correspondences may be determined for and used in a plurality of different applications. In one example, a pixel correspondence between two images captured at different times may be determined as part of an optical flow calculation. In another example, a pixel correspondence between two simultaneously-captured images may be determined as part of a stereo disparity calculation.

SUMMARY

A pixel correspondence between two images may be determined based on a comparison of feature vectors associated with pixels of a first image to feature vectors associated with pixels of a second image. This comparison of the feature vectors may generate a cost volume that indicates, for each pair of compared pixels, a similarity between pixels of the pair. The similarity between two pixels may be quantified by an inner product between the feature vectors associated with the two pixels. However, rather than using a Euclidean inner product, the cost volume may be generated using a learned/trained elliptical inner product. Specifically, a first feature vector of the pair of pixels may be transformed by a learned/trained kernel matrix, and the transformed first feature vector may then be multiplied by a second feature vector of the pair of pixels. The kernel matrix may be learned/trained to define the elliptical inner product space. The cost volume generated based on the learned/trained elliptical inner product may then be used to determine the pixel correspondence between the two images.

In a first example, a computer-implemented method includes obtaining (i) a first plurality of feature vectors associated with a first image and (ii) a second plurality of feature vectors associated with a second image. The computer-implemented method also includes generating a plurality of transformed feature vectors by transforming each respective feature vector of the first plurality of feature vectors by a kernel matrix trained to define an elliptical inner product space. The computer-implemented method additionally includes generating a cost volume by determining, for each respective transformed feature vector of the plurality of transformed feature vectors, a plurality of inner products. Each respective inner product of the plurality of inner products may be between the respective transformed feature vector and a corresponding candidate feature vector of a corresponding subset of the second plurality of feature vectors. The computer-implemented method further includes determining, based on the cost volume, a pixel correspondence between the first image and the second image.

In a second example, a system includes a processor and a non-transitory computer-readable storage medium having stored thereon instructions that, when executed by the processor, cause the processor to perform operations. The operations include obtaining (i) a first plurality of feature vectors associated with a first image and (ii) a second plurality of feature vectors associated with a second image. The operations also include generating a plurality of transformed feature vectors by transforming each respective feature vector of the first plurality of feature vectors by a kernel matrix trained to define an elliptical inner product space. The operations additionally include generating a cost volume by determining, for each respective transformed feature vector of the plurality of transformed feature vectors, a plurality of inner products. Each respective inner product of the plurality of inner products may be between the respective transformed feature vector and a corresponding candidate feature vector of a corresponding subset of the second plurality of feature vectors. The operations further include determining, based on the cost volume, a pixel correspondence between the first image and the second image.

In a third example, a non-transitory computer-readable storage medium is provided having stored thereon instructions that, when executed by a computing system, cause the computing system to perform operations. The operations include obtaining (i) a first plurality of feature vectors associated with a first image and (ii) a second plurality of feature vectors associated with a second image. The operations also include generating a plurality of transformed feature vectors by transforming each respective feature vector of the first plurality of feature vectors by a kernel matrix trained to define an elliptical inner product space. The operations additionally include generating a cost volume by determining, for each respective transformed feature vector of the plurality of transformed feature vectors, a plurality of inner products. Each respective inner product of the plurality of inner products may be between the respective transformed feature vector and a corresponding candidate feature vector of a corresponding subset of the second plurality of feature vectors. The operations further include determining, based on the cost volume, a pixel correspondence between the first image and the second image.

In a fourth example, a system is provided that includes means for obtaining (i) a first plurality of feature vectors associated with a first image and (ii) a second plurality of feature vectors associated with a second image. The system also includes means for generating a plurality of transformed feature vectors by transforming each respective feature vector of the first plurality of feature vectors by a kernel matrix trained to define an elliptical inner product space. The system additionally includes means for generating a cost volume by determining, for each respective transformed feature vector of the plurality of transformed feature vectors, a plurality of inner products. Each respective inner product of the plurality of inner products may be between the respective transformed feature vector and a corresponding candidate feature vector of a corresponding subset of the second plurality of feature vectors. The system further includes means for determining, based on the cost volume, a pixel correspondence between the first image and the second image.

One or more of the following features may apply to one or each of the above examples.

The kernel matrix may be symmetric and positive definite.

The kernel matrix may be defined based on a product of (i) a diagonal matrix that includes a plurality of positive diagonal values and (ii) an orthogonal matrix.

The kernel matrix may be defined via eigendecomposition by determining (i) a first product between a transpose of the diagonal matrix and the orthogonal matrix, and (ii) a second product between the first product and the diagonal matrix.

Each respective positive diagonal value of the plurality of positive diagonal values of the diagonal matrix may include a respective weight applied to a corresponding dimension of each respective feature vector of the first plurality of feature vectors. The orthogonal matrix may be configured to apply a rotation to each respective feature vector of the first plurality of feature vectors.

Each respective positive diagonal value of the plurality of positive diagonal values may be expressed as a function of a corresponding training parameter. The function may map (i) real number values assigned to the corresponding training parameter to (ii) positive real number values. The kernel matrix may be trained to define the elliptical inner product space by iteratively adjusting, for each respective positive diagonal value, a real number value assigned to the corresponding training parameter.

The orthogonal matrix may be an element of a subset of a special orthogonal group of matrices. The subset may be selected such that eigenvalues of matrices of the subset exclude negative one.

Matrices of the subset may be connected. The orthogonal matrix may be expressed using a Cayley representation as a product of: (i) a difference between an identity matrix and a training matrix, and (ii) an inverse of a sum of the identity matrix and the training matrix. The training matrix may be skew-symmetric. The kernel matrix may be trained to define the elliptical inner product space by initializing the training matrix as the identity matrix and iteratively adjusting values of the training matrix.

The orthogonal matrix may be an element of a Stiefel matrix manifold that includes a plurality of square orthonormal matrices. The kernel matrix may be trained to define the elliptical inner product space by a Riemann gradient descent that includes: determining a projection of a gradient from the Stiefel matrix manifold to a tangent space at the orthogonal matrix, adjusting values of the orthogonal matrix based on the projection of the gradient, and determining a retraction of the orthogonal matrix as adjusted into the Stiefel matrix.

Each respective feature vector of the first plurality of feature vectors may be associated with a corresponding pixel of the first image. Each respective feature vector of the second plurality of feature vectors may be associated with a corresponding pixel of the second image.

For a respective transformed feature vector associated with a corresponding pixel located at a particular pixel position within the first image, the corresponding subset of the second plurality of feature vectors may be associated with a plurality of pixels located within a search window that includes the particular pixel position within the second image.

The first image and the second image may each represent an environment.

Determining the pixel correspondence between the first image and the second image may include determining, based on the cost volume and for each respective pixel of a plurality of pixels in the first image, a corresponding pixel in the second image determined to represent a same portion of the environment as the respective pixel.

The first image may represent the environment at a first time. The second image may represent the environment at a second time. Determining the pixel correspondence between the first image and the second image may include determining, by way of one or more machine learning models, an optical flow between the first image and the second image based on the cost volume.

The first image and the second image may be stereoscopic images of the environment. Determining the pixel correspondence between the first image and the second image may include determining, by way of one or more machine learning models, a depth image based on the cost volume.

Obtaining the first plurality of feature vectors and the second plurality of feature vectors may include generating the first plurality of feature vectors by processing the first image by one or more machine learning models, and generating the second plurality of feature vectors by processing the second image by the one or more machine learning models.

The first plurality of feature vectors and the second plurality of feature vectors may correspond to a first size scale of the first image and the second image. A third plurality of feature vectors associated with the first image and a fourth plurality of feature vectors associated with the second image may be obtained. The third plurality of feature vectors and the fourth plurality of feature vectors may correspond to a second size scale of the first image and the second image. The second size scale may be larger than the first size scale. The fourth plurality of feature vectors may be warped based on the pixel correspondence between the first image and the second image at the first size scale. A second plurality of transformed feature vectors may be generated by transforming each respective feature vector of the third plurality of feature vectors by the kernel matrix. A second cost volume may be generated by determining, for each respective transformed feature vector of the second plurality of transformed feature vectors, a second plurality of inner products. Each respective inner product of the second plurality of inner products may be between the respective transformed feature vector of the second plurality of transformed feature vectors and a corresponding candidate feature vector of a corresponding subset of the fourth plurality of feature vectors as warped. Based on the second cost volume, a second pixel correspondence may be determined between the first image and the second image at the second size scale.

These, as well as other examples, aspects, advantages, and alternatives, will become apparent to those of ordinary skill in the art by reading the following detailed description, with reference where appropriate to the accompanying drawings. Further, this summary and other descriptions and figures provided herein are intended to illustrate implementations by way of example only and, as such, that numerous variations are possible. For instance, structural elements and process steps can be rearranged, combined, distributed, eliminated, or otherwise changed, while remaining within the scope of the examples as claimed.

BRIEF DESCRIPTION OF THE DRAWINGS

FIGS. 8A and 8B illustrate testing results, in accordance with examples described herein.

DETAILED DESCRIPTION

Figure 1:
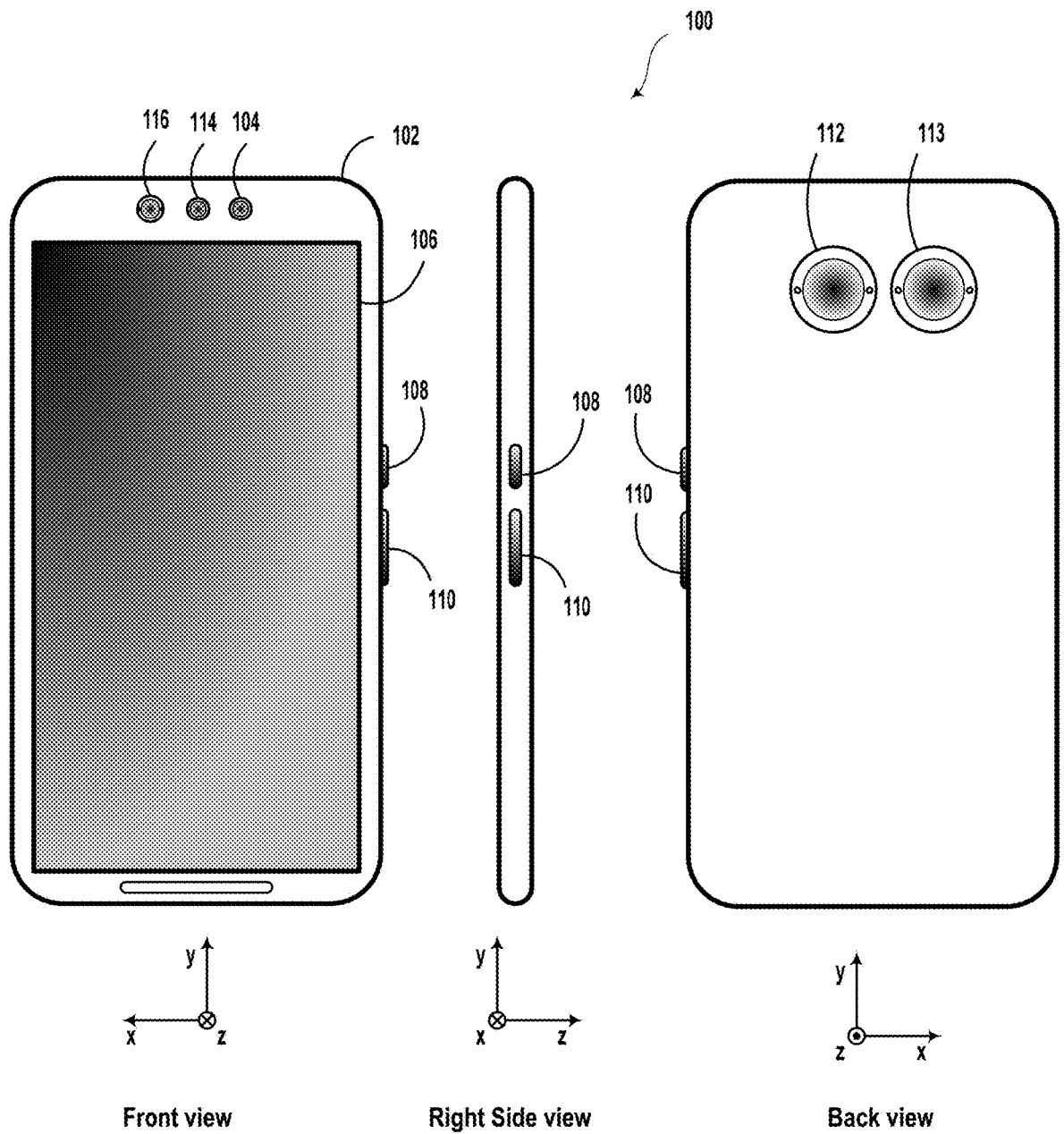
FIG. 1 illustrates a computing system, in accordance with examples described herein.

Example methods, devices, and systems are described herein. It should be understood that the words "example" and "exemplary" are used herein to mean "serving as an example, instance, or illustration." Any example or feature described herein as being an "example," "exemplary," and/or "illustrative" is not necessarily to be construed as preferred or advantageous over other examples or features unless stated as such. Thus, other examples can be utilized and other changes can be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall examples, with the understanding that not all illustrated features are necessary for each example.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

A pixel correspondence between two images, sometimes referred to as a pixel disparity, may indicate pairs of pixels where each pixel of the pair provides a different representation of a same portion of an environment. The pixel correspondence may be determined based on a cost volume. The cost volume may indicate a degree of similarity between a plurality of potentially-matching pixel pairs in a first image and a second image. Specifically, the cost volume may indicate, for each respective pixel in the first image, a plurality of similarity metrics. Each respective similarity metric of the plurality of similarity metrics may be associated with a corresponding candidate pixel of a plurality of candidate pixels located within a search window in the second image. The search window (e.g., square, rectangle, etc.) may be used to select the plurality candidate pixels from the second image, and it's position within the second image may be based on (e.g., centered on) the coordinates of the respective pixel in the first image. Thus, the search window may indicate the candidate pixels in the second image that are most likely to correspond to the respective pixel in the first image.

A similarity metric between a first pixel and a second pixel may be based on an inner product between a first feature vector associated with the first pixel and a second feature vector associated with the second pixel. A feature vector associated with a pixel may be determined by processing the pixel and/or one or more neighboring pixels by machine learning algorithms (e.g., convolutional neural networks), rule-based image processing algorithms, and/or combinations thereof. Thus, the feature vector may represent the informational content of the pixel and/or the one or more neighboring pixels. The inner product between the first feature vector and the second feature vector may thus represent an extent of similarity between these two feature vectors.

In some cases, however, some dimensions of the feature vectors may be correlated with one another, and may thus at least partly represent duplicative information. Further, some dimensions of the feature vectors may contain information that is useful in identifying pixel correspondences, while other dimensions may contain noise or information that is not as relevant. These problems may result from the combination of algorithms used to generate the feature vectors sometimes generating correlated and/or noisy vector values. Constructing the cost volume using a Euclidean inner product space does not provide a way to account for the correlations among different dimensions of the feature vectors and/or a way to weigh discriminative dimensions of the feature vectors differently than dimensions that represent noise and/or less relevant information.

Accordingly, rather than defining the cost volume using the Euclidean inner product, the cost volume may instead be defined based on an elliptical inner product. Specifically, the elliptical inner product may be determined by transforming the first feature vector by a kernel matrix, and subsequently multiplying the transformed first feature vector by the second feature vector. The kernel matrix may be configured to define the elliptical inner product space via a training process. Thus, a cost volume generated using this kernel matrix may be referred to as a learned cost volume and/or a trained cost volume. The learned cost volume may allow for more accurate determinations of pixel correspondences when images include large pixel displacements, textureless regions, motion blur, occlusions, illumination changes, and non-Lambertian reflection, among others.

In some cases, a particular trained kernel matrix may be specific to feature vectors generated using a particular set of algorithms (e.g., convolutional neural networks). Thus, as the algorithms used to generate the feature vectors are modified, the correlations and noise generated thereby may change. Thus, the kernel matrix may be retrained to appropriately adjust the elliptical inner product space to handle the correlations and noise resulting from the modified algorithms.

In order to define a valid inner product space, the kernel matrix may be symmetric and positive-definite. Explicitly imposing the constraints of symmetry and positive definiteness on the kernel matrix during training may complicate the training process, since each update to the kernel matrix made during training may need to both follow the gradient and result in a symmetric and positive definite matrix. Thus, potential updates that follow the gradient but do not result in a symmetric and positive definite matrix may be discarded until an update is determined that does result in a symmetric and positive definite matrix. This iterative process may be time consuming and computationally wasteful. Accordingly, rather than imposing the constraints of symmetry and positive definiteness on the kernel matrix directly, the kernel matrix may instead be decomposed into a diagonal matrix and an orthogonal matrix via eigenvalue decomposition.

The diagonal matrix may include, along its diagonal, the eigenvalues of the kernel matrix. In order to satisfy the requirement of positive definiteness, the eigenvalues may be positive. The diagonal matrix may operate to re-weigh different dimensions of the feature vectors, which may be viewed geometrically as a stretching of the coordinate axes. For example, the diagonal matrix may amplify discriminative dimensions of the feature vectors while suppressing the dimensions that represent noise and/or indiscriminate signals. The eigenvalues represented by the diagonal matrix may be parametrized by a function that maps real values of a training parameter to positive real values of the eigenvalues. Thus, the training process may be carried out by modifying the training parameter, which is unconstrained, rather than the eigenvalue itself, which is to be positive.

The orthogonal matrix may, as the name implies, be an orthogonal matrix such that a transpose of the orthogonal matrix is equal to an inverse of the orthogonal matrix. The orthogonal matrix may operate to linearly transform the feature vector into a new feature space which accounts for correlation among different dimensions thereof. This transformation may be viewed geometrically as a rotation of the coordinate axes.

The orthogonal matrix may be trained either by parameterizing the orthogonal matrix in terms of a skew symmetric training matrix using the Cayley representation/transform, or by Riemann gradient descent on a Stiefel matrix manifold. In either case, the orthogonality of the orthogonal matrix may be achieved as a result of the training process without needing to impose thereon any explicit constraints, thus allowing the training process to freely follow the gradient determined with respect to the training parameters.

Specifically, using the Cayley representation, the orthogonal matrix may be selected from a subset of the special orthogonal group of matrices, where matrices of the subset are connected and do not include eigenvalues of negative one in their spectra. Matrices of the subset may be expressed using the Cayley transform as a product of (i) a difference between an identity matrix and the skew symmetric training matrix and (ii) an inverse of a sum of the identity matrix and the skew symmetric training matrix. Since matrices of the subset are connected and include the identity matrix, the skew symmetric training matrix may be initiated to the identity matrix and its values may be iteratively refined until a desired orthogonal matrix is reached. The desired orthogonal matrix may be reached when the cost volume generated based thereon allows for determination of a pixel correspondence having at least a threshold accuracy.

On the other hand, using Riemann gradient descent may involve selecting an initial orthogonal matrix from the Stiefel matrix manifold and determining a standard gradient at the point on the Stiefel matrix manifold corresponding to the initial orthogonal matrix. The standard gradient may then be projected to a tangent space that is tangent to the Stiefel matrix manifold at the point thereon corresponding to the initial orthogonal matrix, resulting in a natural gradient. The natural gradient may be used to update the values of the projected initial orthogonal matrix, resulting in an updated matrix that likely is no longer orthogonal since it resides in the tangent space, rather than the Stiefel matrix manifold. Thus, the updated matrix may be retracted back into the Stiefel matrix manifold, resulting in an updated matrix that is orthogonal.

II. Example Computing Devices

FIG. 1 illustrates an example form factor of computing system 100. Computing system 100 may be, for example, a mobile phone, a tablet computer, or a wearable computing device. However, other examples are possible. Computing system 100 may include various elements, such as body 102, display 106, and buttons 108 and 110. Computing system 100 may further include front-facing camera 104, rear-facing cameras 112 and 113, front-facing infrared camera 114, and infrared pattern projector 116.

Front-facing camera 104 may be positioned on a side of body 102 typically facing a user while in operation (e.g., on the same side as display 106). Rear-facing cameras 112 and 113 may be positioned on a side of body 102 opposite front-facing camera 104. Referring to the cameras as front and rear facing is arbitrary, and computing system 100 may include multiple cameras positioned on various sides of body 102. Front-facing camera 104 and rear-facing cameras 112 and 113 may each be configured to capture images in the visible light spectrum.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104, rear-facing camera 112, rear-facing camera 113, and/or infrared camera 114, and/or an image that could be captured or was recently captured by one or more of these cameras. Thus, display 106 may serve as a viewfinder for the cameras. Display 106 may also support touchscreen functions that may be able to adjust the settings and/or configuration of any aspect of computing system 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic camera. Rear-facing camera 112, rear-facing camera 113, and/or infrared camera 114 may be similarly or differently arranged. Additionally, one or more of front-facing camera 104, rear-facing camera 112, rear-facing camera 113, or infrared camera 114, may be an array of one or more cameras. In one example, rear-facing camera 112 and rear-facing camera 113 may form part of a stereoscopic camera.

One or more of front-facing camera 104, rear-facing camera 112, and/or rear-facing camera 113 may include or be associated with an illumination component that provides a light field in the visible light spectrum to illuminate a target object. For instance, an illumination component could provide flash or constant illumination of the target object. An illumination component could also be configured to provide a light field that includes one or more of structured light, polarized light, and light with specific spectral content.

Other types of light fields known and used to recover three-dimensional (3D) models from an object are possible within the context of the examples herein.

Infrared pattern projector 116 may be configured to project an infrared structured light pattern onto the target object. In one example, infrared projector 116 may be configured to project a dot pattern and/or a flood pattern. Thus, infrared projector 116 may be used in combination with infrared camera 114 to determine a plurality of depth values corresponding to different physical features of the target object.

Namely, infrared projector 116 may project a known and/or predetermined dot pattern onto the target object, and infrared camera 114 may capture an infrared image of the target object that includes the projected dot pattern. Computing system 100 may then determine a correspondence between a region in the captured infrared image and a particular part of the projected dot pattern. Given a position of infrared projector 116, a position of infrared camera 114, and the location of the region corresponding to the particular part of the projected dot pattern within the captured infrared image, computing system 100 may then use triangulation to estimate a depth to a surface of the target object. By repeating this for different regions corresponding to different parts of the projected dot pattern, computing system 100 may estimate the depth of various physical features or portions of the target object. In this way, computing system 100 may be used to generate a three-dimensional (3D) model of the target object.

Computing system 100 may also include an ambient light sensor that may continuously or from time to time determine the ambient brightness of a scene (e.g., in terms of visible and/or infrared light) that cameras 104, 112, 113, and/or 114 can capture. In some implementations, the ambient light sensor can be used to adjust the display brightness of display 106. Additionally, the ambient light sensor may be used to determine an exposure length of one or more of cameras 104, 112, 113, or 114, or to help in this determination.

Computing system 100 could be configured to use display 106 and front-facing camera 104, rear-facing camera 112, rear-facing camera 113, and/or front-facing infrared camera 114 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving digital camera device 100 a predetermined distance, or according to a predetermined capture schedule.

As noted above, the functions of computing system 100 may be integrated into a computing device, such as a wireless computing device, cell phone, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a computer (such as a desktop, notebook, tablet, or handheld computer), personal digital assistant (PDA), a home automation component, a digital video recorder (DVR), a digital television, a remote control, a wearable computing device, a gaming console, a robotic device, or some other type of device. Computing device 200 may be equipped with at least some image capture and/or image processing capabilities. It should be understood that computing device 200 may represent a physical image processing system, a particular physical hardware platform on which an image sensing and processing application operates in software, or other combinations of hardware and software that are configured to carry out image capture and/or processing functions.

Figure 2:
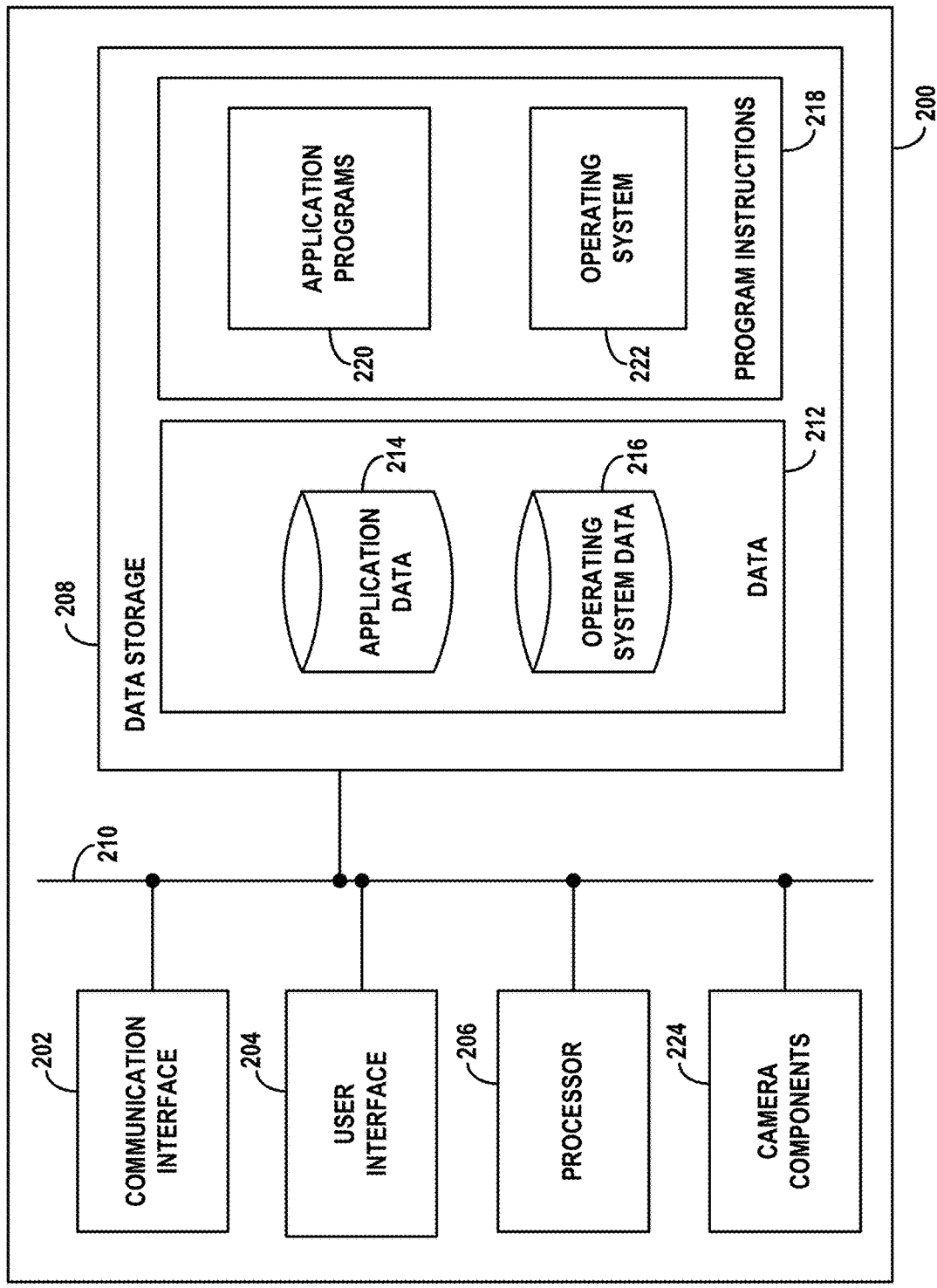
FIG. 2 illustrates a computing device, in accordance with examples described herein.

As shown in FIG. 2, computing device 200 may include communication interface 202, user interface 204, processor 206, data storage 208, and camera components 224, all of which may be communicatively linked together by a system bus, network, or other connection mechanism 210.

Communication interface 202 may allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing device 200 (e.g., in both the visible and infrared spectrum). Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 400-700 nanometers) and components configured for capturing of images in the infrared light spectrum (e.g., electromagnetic radiation having a wavelength of 701 nanometers-1 millimeter). Camera components 224 may be controlled at least in part by software executed by processor 206.

III. Example Cost Volume Model

Figure 3A:
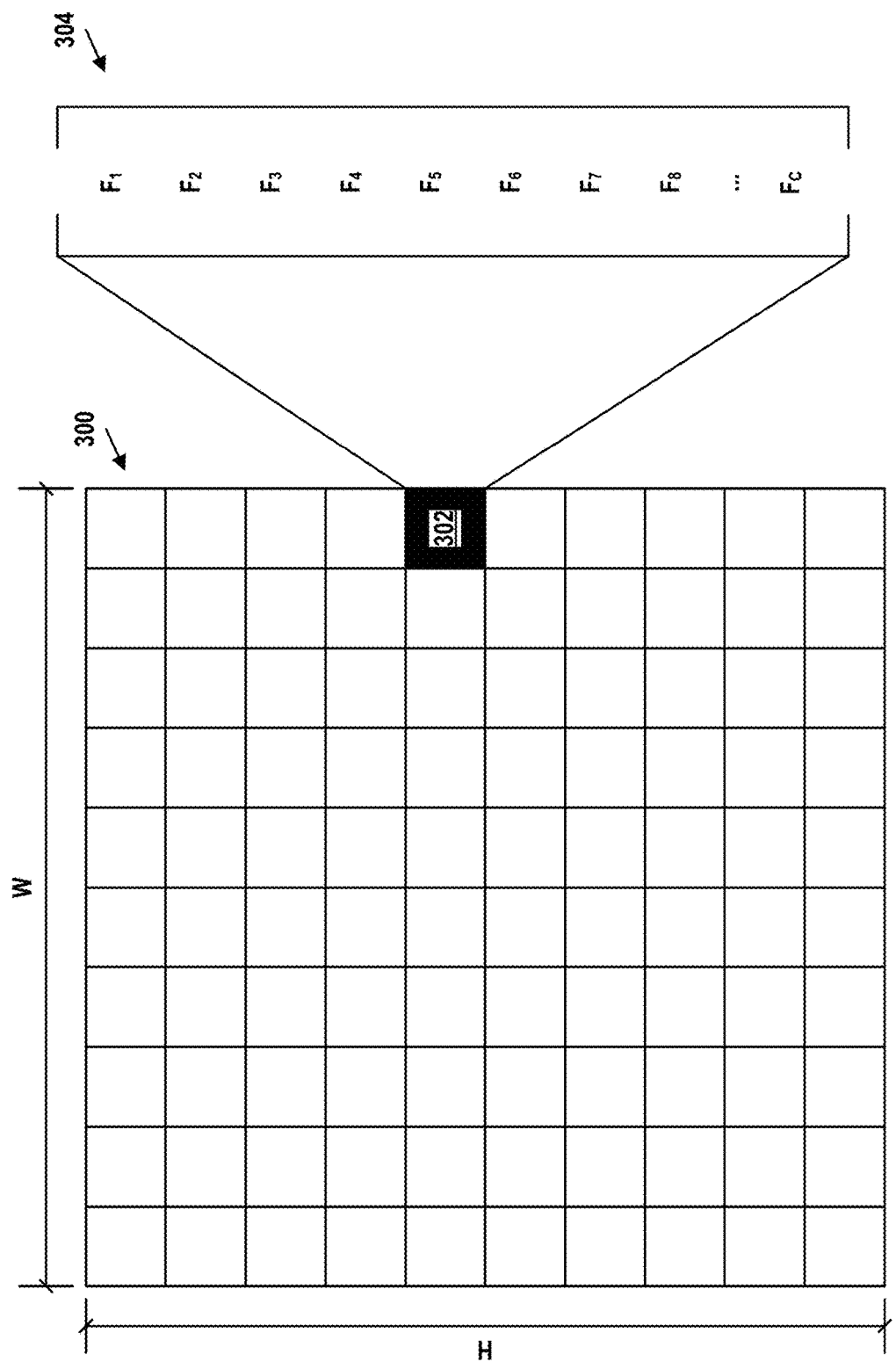
FIG. 3A illustrates a feature vector, in accordance with examples described herein.

FIG. 3A illustrates an example feature vector associated with a pixel of an image. Specifically, FIG. 3A illustrates image 300 having a width W and a height H, each measured in pixels. Thus, image 300 includes H×W pixels. Each pixel of image 300 may be associated with a corresponding feature vector. For example, pixel 302 may be associated with feature vector 304, which may include a plurality of values $F_1$-$F_C$ (i.e., $F_1$, $F_2$, $F_3$, $F_4$, $F_5$, $F_6$, $F_7$, and $F_8$ through $F_C$) each associated with a corresponding dimension of feature vector 304.

Feature vector 304 may be generated by processing pixel 302 and/or one or more other pixels adjacent to pixel 302 by way of one or more machine learning models. For example, feature vector 304 may represent convolutional features of pixel 302 and/or its neighboring pixels determined by way of one or more convolutional neural networks. In another example, feature vector 304 may represent the output of processing pixel 302 and/or its neighboring pixels by way of one or more rule-based image processing algorithms. In further examples, the values $F_1$-$F_C$ of feature vector 304 may be determined in other ways. Regardless of the specific manner in which values $F_1$-$F_C$ of feature vector 304 are determined, feature vector 304 may represent the informational content of pixel 302 and/or the one or more other pixels adjacent thereto (e.g., the presence of certain colors, geometric features, and/or other patterns therein). Thus, the respective feature vectors of two different pixels may be used to determine a similarity metric between the two different pixels. When the two different pixels are part of two different images, the similarity metric may be used to find a correspondence between pixels of the two images. The pixel correspondence may, in some cases, be referred to as a pixel disparity.

Figure 3B:
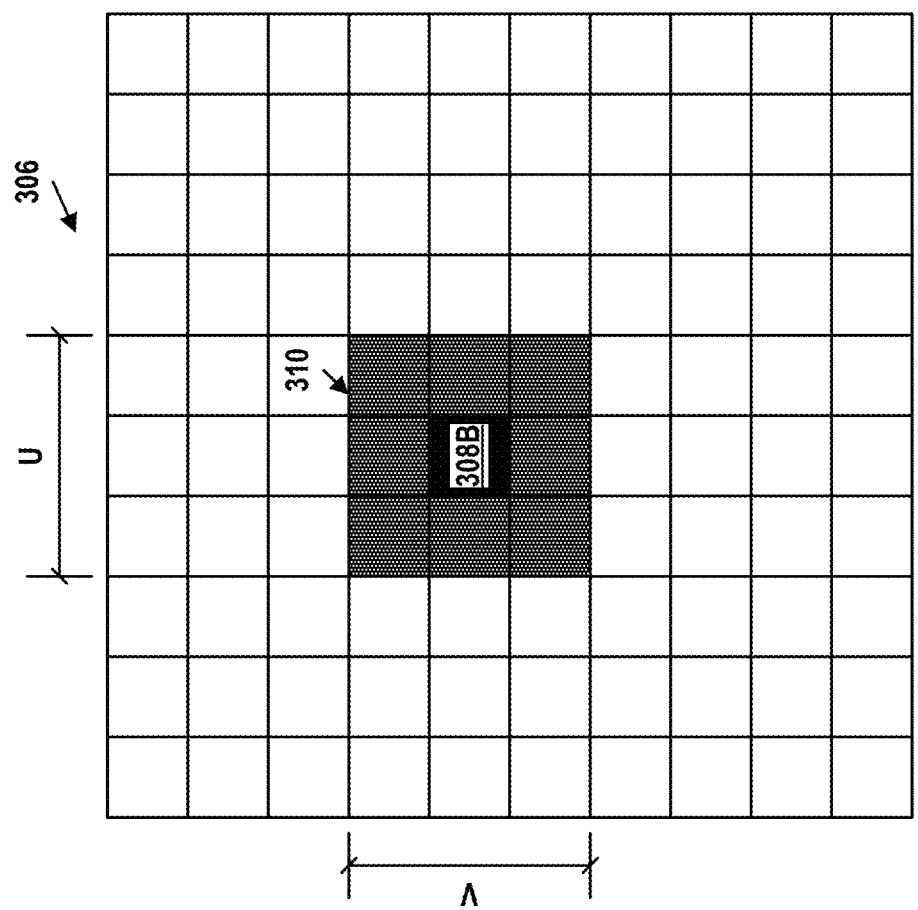
FIG. 3B illustrates an image search window, in accordance with examples described herein.
Figure 3B:
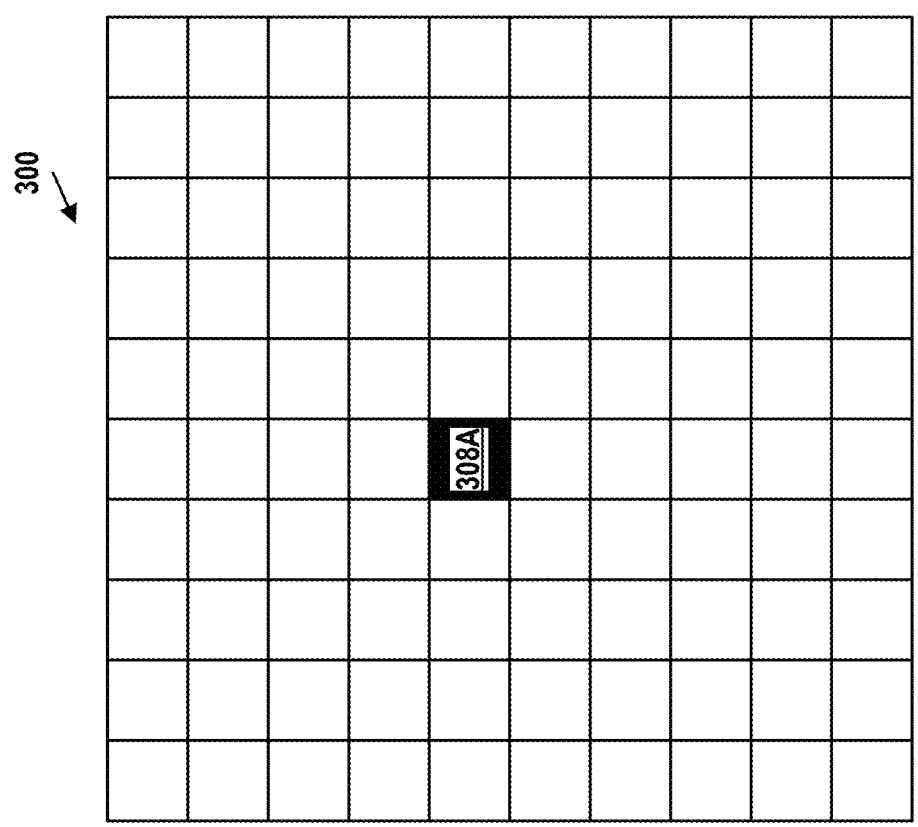

Accordingly, FIG. 3B illustrates part of a process for finding a pixel correspondence between two images. Specifically, FIG. 3B includes image 300 and image 306, each of which may provide different representations of a common environment. Images 300 and/or 306 may be generated using cameras 104, 112, 113, and/or 114 of computing system 100 and/or camera components 224 of computing device 200. In one example, images 300 and 306 may be captured substantially simultaneously using a stereoscopic camera, and may thus each represent the environment from different perspectives. Thus, finding a pixel correspondence between images 300 and 306 may serve as a basis for determining a depth image based on images 300 and 306. In another example, image 300 may be captured at a first time and image 306 may be captured at a second time later than the first time, and may thus each represent the environment at different points in time. Thus, finding a pixel correspondence between images 300 and 306 may serve as a basis for determining an optical flow associated with images 300 and 306.

A correspondence between a particular pixel in image 300 and another pixel in image 306 may be determined by comparing the particular pixel to a plurality of candidate pixels of image 306 that are located within a search window. The position of the search window within image 306 may be based on coordinates of the particular pixel in image 300. For example, search window 310 shown in image 306 may be used to find a match for pixel 308A in image 300. Search window 310 may have a width U and a height V and may be centered on pixel 308B in image 306. Pixel 308A and 308B may share the same coordinates in images 300 and 306, respectively. That is, pixel 308A may be located in row 5, column 5 of image 300, and pixel 308B may be located in row 5, column 5 of image 306.

The respective feature vector of each pixel in image 300 may be compared to U×V candidate feature vectors of corresponding pixels in image 306. Search window 310 may indicate a maximum expected displacement of the environmental feature represented by pixel 308A between images 300 and 306. In other implementations, search windows 310 may include, but might not be centered on, pixel 308B. Each respective pixel in image 300 may be associated with a corresponding search window in image 306 that includes the position of the respective pixel (e.g., by being centered on this position).

Figure 3C:
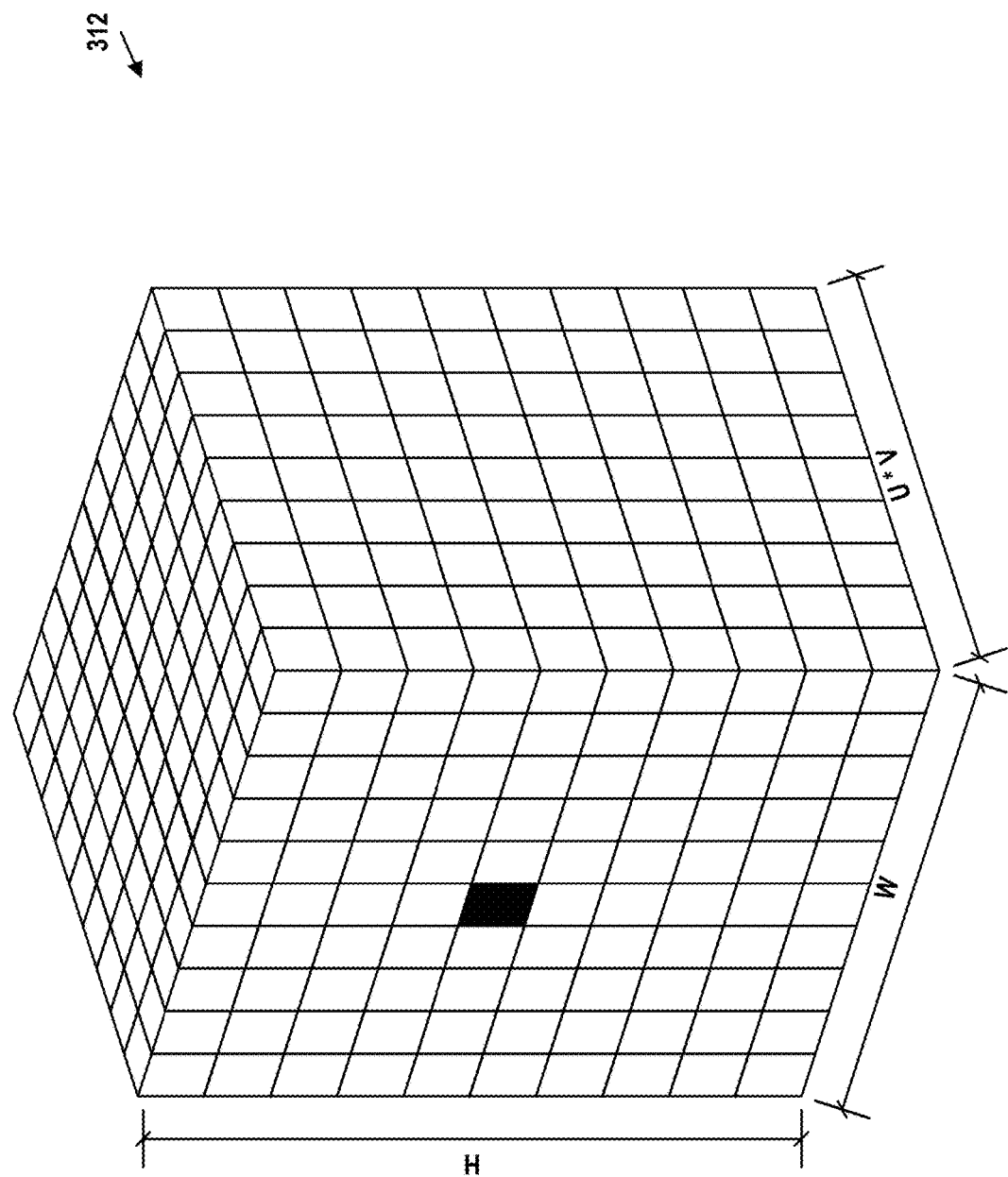
FIG. 3C illustrates a cost volume, in accordance with examples described herein.

The comparison of the feature vector of each respective pixel in image 300 to the candidate feature vectors of a plurality of candidate pixels in image 306 located within a corresponding search window may generate a cost volume, as illustrated in FIG. 3C. Specifically, cost volume 312 of FIG. 3C includes an H×W×U*V array of similarity metrics resulting from comparisons of the feature vectors of images 300 and 306. Specifically, image 300 includes H×W pixels, each associated with a corresponding feature vector. Each of these H×W feature vectors is compared to U*V candidate feature vectors in image 306 that represent a potential pixel correspondence (i.e., are associated with pixels within a corresponding search window). Thus, each of the H×W pixels of image 300 is associated with U*V potential pixel matched, resulting in the H×W×U*V dimensions of cost volume 312. In some implementations, cost volume 312 may instead be represented as a 4-dimensional H×W×U×V tensor, rather than the 3-dimensional H×W×U*V tensor illustrated in FIG. 3C, but may nevertheless represent the same informational content.

Cost volume 312 may represent the cost associated with a plurality of possible pixel correspondences between images 300 and 306. Cost volume 312 may be processed by one or more machine learning models to select, for each pixel of a plurality of pixels in image 300, a corresponding pixel in image 306. The pixel in image 300 and the corresponding pixel in image 306 matched thereto should represent the same and/or substantially the same portion of the environment, albeit from different perspectives and/or at different times. The one or more machine learning model may be configured to select individual pixel pairings that improve or optimize the global cost of such pairings, rather than optimizing a local cost of the pairings. That is, the one or more machine learning models may select pixel correspondences that work well and/or best across images 300 and 306 as a whole, rather than only for some of the pixels therein.

In some implementations, the similarity metric between two feature vectors of two corresponding pixels may be represented by a Euclidean inner product between the two feature vectors. However, the Euclidean inner product may limit the representational capacity of cost volume 312 for at least two reasons. First, the Euclidean inner product might not account for correlations among different dimensions of the feature vectors. Second, each dimension of the feature vectors may contribute equally to the Euclidean inner product. Thus, dimensions that represent noise may be given the same weight by the Euclidean inner product as dimensions that represent discriminative signals that are useful in determining accurate pixel correspondences. Accordingly, rather than determining cost volume 312 using a fixed calculation on the basis of the Euclidean inner product, cost volume 312 may instead be constructed using a trained cost volume model.

Figure 4:
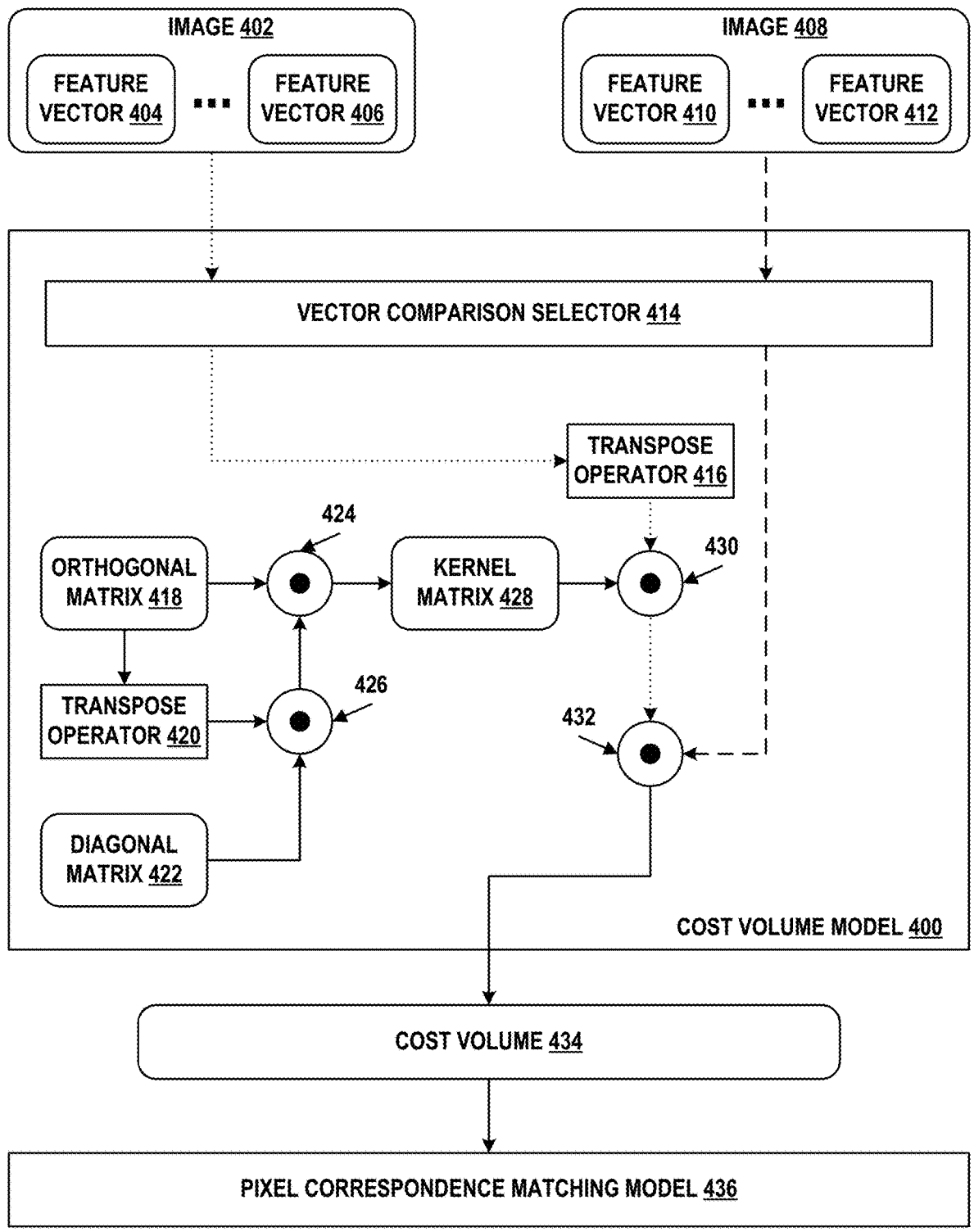
FIG. 4 illustrates a trainable cost volume model, in accordance with examples described herein.

FIG. 4 illustrates cost volume model 400 which may be trained to account for the correlation among different dimensions of feature vectors and to re-weigh the contribution of each feature vector dimension to the cost volume. Cost volume model 400 may be configured to compare feature vectors 404-406 of image 402 to feature vectors 410-412 of image 408 to determine cost volume 434. Images 402 and 408 of FIG. 4 may represent images 300 and 306 of FIG. 3B, and cost volume 434 may represent cost volume 312 of FIG. 3C. Pixel correspondence matching model 436 may be configured to determine a pixel correspondence between the respective pixels of images 402 and 408 based on cost volume 434.

Cost volume model 400 may include vector comparison selector 414, which may be configured to iterate through candidate pixel pairings for images 402 and 408. Specifically, vector comparison selector 414 may be configured to compare each respective feature vector of feature vectors 404-406 to each respective candidate feature vector of a corresponding plurality of candidate feature vectors selected from feature vectors 410-412. The corresponding plurality of candidate feature vectors may be selected based on a search window corresponding to the respective feature vector from image 402, as illustrated in and discussed with respect to FIG. 3B. Thus, the corresponding plurality of candidate feature vectors may be associated with pixels that are within a threshold distance (e.g., as defined by a search window) of a pixel coordinate associated with the respective feature vector from image 402.

Accordingly, vector comparison selector 414 may implement the functions $k'=(i-(U-1)/2+k)$ and $l'=(j-(V-1)/2+l)$, where $(i, j)$ denotes the coordinates of a pixel associated with the respective feature vector in image 402, U denotes a width of the search window, V denotes a height of the search window, and $(k', l')$ denotes the coordinates of a pixel located within the search window and associated with a particular candidate feature vector in image 408. The values of the index i may range from 0 to H, the values of the index j may range from 0 to W, the values of the index k may range from 0 to U, and the values of the index l may range from 0 to V. Thus, vector comparison selector 414 may iterate $(i, j)$ through every pixel in image 402 and, for each respective pixel in image 402, iterate $(k', l')$ through every pixel in image 408 that is within the search window corresponding to the respective pixel of image 402.

Cost volume model 400 may be configured to apply transpose operator 416 to the respective feature vector of feature vectors 404-406 selected for comparison by vector comparison selector 414. Cost volume model 400 may also be configured to apply inner product operator 430 to the transposed respective feature vector and kernel matrix 428. Cost volume model 400 may additionally be configured to apply inner product operator 432 to the output of inner product operator 430 and a candidate feature vector selected from a corresponding subset of feature vectors 410-412 by vector comparison selector 414. Thus, cost volume 400 may implement the function $CV(F_1, F_2)=(F_{i,j}^1)^T W F_{k',l'}^2$, where $F_1$ is a W×H×C tensor representing feature vectors 404-406 (with C representing the number of dimensions of each feature vector), $F_2$ is a W×H×C tensor representing feature vectors 410-412, $F_{i,j}^1$ is a vector having C values and representing the respective feature vector selected from $F_1$ for comparison, W is a C×C matrix representing kernel matrix 428, and $F_{k',l'}$ is a vector having C values and representing the candidate feature vector selected from $F_2$ for comparison.

Kernel matrix 428 may be learned and/or trained to define an elliptical inner product space. For comparison, a cost volume determined using the Euclidean inner product may be expressed by the function $CV'(F_1, F_2)=(F_{i,j}^1)^T F_{k',l'}^2$, where the matrix W is not used to transform $F_{i,j}^1$ prior to taking the inner product with $F_{k',l'}^2$. As a result of training, kernel matrix 428 may be configured to decorrelate and reweigh different dimensions of feature vectors $F_{i,j}^1$, thus allowing cost volume 434 to more accurately represent each candidate pixel correspondence. Since kernel matrix 428 defines an inner product space, kernel matrix 428 may be a symmetric (i.e., $W=W^T$) and positive definite matrix (i.e., having only positive eigenvalues) in order to comply with the mathematical definition and properties of inner product. Using a kernel matrix that is not symmetric and/or positive definite, and thus does not define a valid inner product space, may result in a cost volume that is not as useful for finding pixel correspondences as a cost volume resulting from a valid inner product space.

The entries of kernel matrix 428 may represent the learnable and/or trainable parameters of cost volume model 400. However, imposing the constraints of symmetry and positive definiteness during the training process may hinder the training process of cost volume model 400. Accordingly, kernel matrix 428 may be expressed as a product of orthogonal matrix 418 and diagonal matrix 422. Specifically, based on eigendecomposition and/or spectral decomposition, kernel matrix 428 may be expressed as $W=P^T \Lambda P$, where W represents kernel matrix 428, $\Lambda$ represents diagonal matrix 422, P represents orthogonal matrix 418, and $P^T$ represents orthogonal matrix 418 transformed by transpose operator 420. Thus, kernel matrix 428 may be determined by transpose operator 420, inner product operator 426, and/or inner product operator 424 operating on orthogonal matrix 418 and/or diagonal matrix 422 as shown in FIG. 4 to compute $W=P^T \Lambda P$.

Diagonal matrix 422 may include the eigenvalues of kernel matrix 428 along its diagonal. That is, $\Lambda=\text{diag}(\lambda_1, \ldots, \lambda_C)$ where $\lambda_i>0$ for all i ranging from 1 to C. Diagonal matrix 422 may have the effect of reweighing different dimension of feature vectors $F_{i,j}^1$, with each eigenvalue $\lambda_i$ constituting a weight for a corresponding dimension of feature vectors $F_{i,j}^1$. Orthogonal matrix 418 may be an orthogonal matrix that satisfies the condition $W=P^T \Lambda P$ or, equivalently, $P^T=P^{-1}$. Orthogonal matrix 418 may have the effect of rotating the coordinate axes, and thus decorrelating the different dimensions of feature vectors $F_{i,j}^1$.

Since, during usage of cost volume model 400, kernel matrix 428 remains constant for each inner product computation between feature vectors, kernel matrix 428 may be computed based on orthogonal matrix 418 and diagonal matrix 422, stored by cost volume model 400, and reused multiple times. That is, in order to reduce computational overhead, kernel matrix 428 might not be recomputed by way of operators 420, 424, and 426 for each computation carried out by operators 416, 430, and 432 based on feature vectors 404-406 and 410-412. Kernel matrix 428 may, however, be recomputed each time orthogonal matrix 418 and/or diagonal matrix 422 is updated due to training.

Figure 5B:
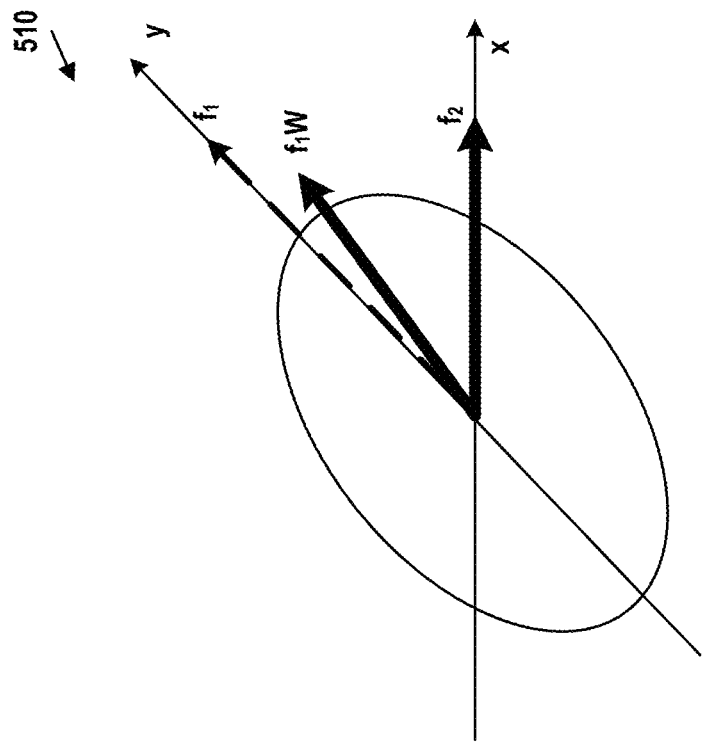
FIG. 5B illustrates aspects of an elliptical inner product space, in accordance with examples described herein.
Figure 5A:
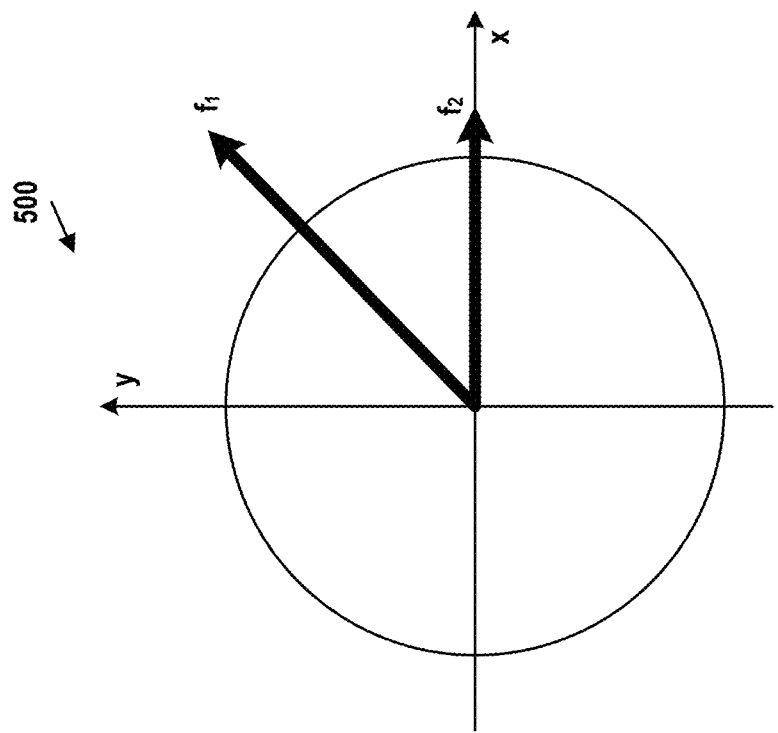
FIG. 5A illustrates aspects of a Euclidean inner product space, in accordance with examples described herein.

FIGS. 5A and 5B visually illustrate the effect of multiplying feature vectors by kernel matrix 428. Specifically, FIG. 5A visually illustrates a Euclidean inner product space defined with respect to Euclidean reference frame 500, while FIG. 5B visually illustrates an elliptical inner product space defined with respect to elliptical reference frame 510. Feature vector $f_1$ plotted along Euclidean reference frame 500 represents an example feature vector selected from $F_1$ and feature vector $f_2$ represents an example feature vector selected from $F_2$.

In Euclidean reference frame 500, feature vector $f_1$ may be correlated with feature vector $f_2$. Specifically, feature vector $f_1$ includes an x-component directed along the same direction as the feature vector $f_1$. Elliptical reference frame 510 may be trained to adjust the extent of correlation between feature vector $f_1$ and $f_2$. Specifically, as illustrated in FIG. 5B, elliptical reference frame 510 may be transformed relative to Euclidean reference frame 500 such that feature vectors $f_1$ and $f_2$ are orthogonal to one another, thus illustrating that kernel matrix 428 may be trained to decorrelate at least some dimensions of the feature vectors.

Transformed feature vector $f_1W$ may be rotated and/or scaled relative to feature vector $f_1$ by the transformation via kernel matrix 428. Due to this rotation and/or scaling, transformed feature vector $f_1W$ may be correlated with feature vector $f_2$ in elliptical reference frame 510 to a different extent than feature vector $f_1$ is correlated with feature vector $f_2$ in Euclidean reference frame 500. Thus, kernel matrix 428 may be trained to adjust the scalar value resulting from taking the inner product between two feature vectors such that the scalar value associated with similar feature vectors is increased and the scalar value associated with dissimilar feature vectors is decreased. In some cases, this may result in the transformed feature vector being orthogonal to or approximately orthogonal to (i.e., uncorrelated to) some candidate feature vectors, thus indicating a poor pixel correspondence match, and being coincident with or approximately coincident with (i.e., highly correlated with) one or more other candidate feature vectors, thus indicating a good pixel correspondence match.

IV. Example Training of the Cost Volume Model

Training kernel matrix 428 directly may be difficult because, in order to define a valid inner product space, values of kernel matrix 428 may be selected such that it is symmetric and positive definite. Thus, with each training iteration, kernel matrix 428 might be updated, based on a gradient descent calculation, with values that (i) follow the gradient and (ii) result in kernel matrix 428 being symmetric and positive definite. Directly finding values for kernel matrix 428 that satisfy both criteria may be difficult and time-consuming. Thus, kernel matrix 428 may instead be expressed based on orthogonal matrix 418 and diagonal matrix 422, each of which may provide a corresponding set of adjustable training parameters that facilitate training/learning of kernel matrix 428.

Due to the positive definiteness of kernel matrix 428, diagonal matrix 422 may comprise positive values (i.e., the eigenvalues of kernel matrix 428) along its diagonal. Rather than explicitly limiting the training process to selecting only positive values for diagonal matrix 422, (i.e., imposing the constraint $\lambda_i>0$ when defining $\Lambda=\text{diag}(\lambda_1, \ldots, \lambda_C)$), the entries $\lambda_i$ may instead be parametrized using a function that maps real values to positive real values. For example, diagonal matrix 422 may be defined based on $\lambda_i=(\pi+2 \arctan(t_i))/(\pi-2 \arctan(t_i))$, where $t_i$ is a training parameter modifiable during training. By expressing the entries $\lambda_i$ of diagonal matrix 422 in terms of a function that maps real values of $t_i$ to positive real values of $\lambda_i$, training parameter $t_i$ may be modifiable based on a gradient descent process without imposing any additional constraints on the range of values that training parameter $t_i$ may have.

Orthogonal matrix 418 may also be parametrized in order to simplify the training process. In one implementation, the training of orthogonal matrix 418 may be facilitated by using the Cayley transform to express orthogonal matrix 418 in terms of a training matrix S and an identity matrix I. Specifically, orthogonal matrix 418 may be expressed according to $P=(I-S)(I+S)^{-1}$, where P represents the orthogonal matrix and is an element of special orthogonal group SO*(n) made up of matrices whose eigenvalues exclude negative one. That is, SO*(n):={A∈SO(n): −1∉σ (A)}, where σ(A) denotes the spectrum of (i.e., the eigenvalues of) A. Training matrix S may be skew-symmetric such that $S^T=-S$, which allows (I+S) to be invertible.

The set of matrices that defines special orthogonal group SO*(C) may be a connected set, and may include a C×C identity matrix I as an element thereof. Accordingly, in training, orthogonal matrix P may be initialized as identity matrix I. Assuming P* to be the optimal orthogonal matrix, P* may be reached via training after initializing orthogonal matrix P as the identity matrix I because matrices of special orthogonal group SO*(C), including P* and I, are connected. Thus, there exists a continuous path joining identity matrix I and any orthogonal matrix P that is an element of special orthogonal group SO*(C), including optimal orthogonal matrix P*.

The entries of training matrix S may be parametrized such that they can be freely adjusted during training without any additional constraints imposed thereupon. For example, in the case where training matrix S is an element of the three-dimensional real number space, training matrix may be parameterized in terms of training parameters $s_1$, $s_2$, and $s_3$ according to S=[row(0, $-s_1$, $-s_2$), row($s_1$, 0, $-s_3$), row($s_2$, $s_3$, 0)]. Additional parameters may be used to define training matrix S in higher dimensions while satisfying the skew-symmetry of training matrix S (i.e., $S^T=-S$).

Accordingly, kernel matrix 428 may be trained by adjusting training matrix parameters $s_1$-$s_C$ (defining orthogonal matrix 418) and/or diagonal matrix parameters $t_1$-$t_C$ (defining diagonal matrix 422) based on a gradient computed based on backpropagation through the cost volume model. In particular, training matrix parameters $s_1$-$s_C$ and/or diagonal matrix parameters $t_1$-$t_C$ may be adjusted freely, without any explicit constraints imposed thereon, because the symmetry and positive definiteness of kernel matrix 428 results from how the values of these parameters are mapped to the values of the entries of orthogonal matrix 418 and diagonal matrix 422.

In an alternative implementation, the training of orthogonal matrix 418 may be performed using Riemann gradient descent on a Stiefel matrix manifold. The Stiefel matrix manifold may be defined according to $V_k(R^n)=\{A\in R^{n\times k}|A^TA=I_k\}$, where $R^{n\times k}$ represents the space of n×k orthogonal matrices. Specifically, orthogonal matrix P may be selected from the Stiefel matrix manifold $V_C(R^C)=\{A\in R^{C\times C}|A^TA=I_C$, which may contain therein all C×C (square) orthogonal matrices, thus satisfying the orthogonality condition of orthogonal matrix P.

At the start of training, initial values may be selected for orthogonal matrix P such that initial orthogonal matrix P lies in the Stiefel matrix manifold $V_C(R^C)$. For example, the initial values for orthogonal matrix P and diagonal matrix A may be selected to initialize kernel matrix W as the identity matrix, that is, W=I. A gradient matrix Z at the point on the Stiefel matrix manifold corresponding to initial orthogonal matrix P may be determined. Gradient matrix Z may represent a standard gradient associated with initial orthogonal matrix P. Gradient matrix Z may be projected onto a tangent space that is tangent to the Stiefel matrix manifold at the point thereon corresponding to initial orthogonal matrix P according to $\emptyset_P(Z)=(I-PP^T)Z+P*skew(P^TZ)$, where skew (X): $=(X-X^T)/2$. The projection $\emptyset_P(Z)$ of gradient matrix Z at initial orthogonal matrix P may represent a natural gradient on the Stiefel matrix manifold.

Gradient descent may be performed based on projection H(Z) to determine an updated matrix P'. For example, updated matrix P' may be determined according to $P'=P-\eta*\emptyset_P(Z)$, where η is a modifiable constant that represents a training rate for the orthogonal matrix. Since updated matrix P' is an element of the tangent space, and is not necessarily orthogonal, updated matrix P' may be retracted back into the Stiefel matrix manifold to generate an updated orthogonal matrix. Specifically, updated matrix P' may be retracted back into the Stiefel matrix manifold according to $\theta_P(P')=(P+P')(I+(P')^TP')^{1/2}$, thereby generating updated orthogonal matrix P.

The projection of the updated orthogonal matrix, adjustment of the values of the projected orthogonal matrix, and retraction of the adjusted orthogonal matrix may be repeated one or more times until a final orthogonal matrix P is achieved. Final orthogonal matrix P may, along with diagonal matrix A, provide a target level of accuracy in matching pixels with respect to a set of test data that includes a plurality of image pairs.

In general, the values of orthogonal matrix P and diagonal matrix A may be determined by training these matrices based on a training dataset that includes a plurality of pairs of images. Each of the two images within each pair may provide a different representation of a common environment, such that there exists a correspondence between at least some of the pixels in the two images. Orthogonal matrix P and diagonal matrix A may be assigned initial values based on which initial values for kernel matrix W may be determined. The plurality of pairs of images of the training dataset may be processed by cost volume model 400 using kernel matrix W assigned the initial values to determine, for each of the plurality of pairs, a training cost volume, which may be represented by cost volume 434 and may be designated a "training" cost volume because it is determined as part of the training process. The training cost volume may be used by pixel correspondence matching model 436 to determine a training pixel correspondence.

The training pixel correspondence may be compared to a ground-truth pixel correspondence and/or an approximation thereof by way of a loss function. In supervised learning applications, the loss function may explicitly compare the training pixel correspondence to a known ground-truth pixel correspondence. In some supervised applications, the training dataset may include pairs of synthetic (e.g., computer generated) images with known pixel correspondences. In unsupervised learning applications, the loss function may measure a photometric loss (e.g., how visually similar two paired pixels actually are to one another), a smoothness loss (e.g., how abruptly the apparent displacement changes between neighboring pixels), and/or a local contrast normalization loss, among other possible loss functions. Thus, the loss functions in unsupervised learning applications may provide an approximation of a ground-truth correspondence, since an explicit ground-truth correspondence might not be known.

A gradient of the loss function may be determined with respect to the training parameters that define orthogonal matrix P and diagonal matrix Λ, and the gradient may be used to determine one or more updates to the training parameters. Once these training parameters are updated, kernel matrix W may be updated based on updated orthogonal matrix P and updated diagonal matrix Λ, and another iteration of the training process may be performed with respect to the training dataset. Thus, kernel matrix W may be iteratively refined. The training may be considered complete when cost volume model 400 generates cost volumes that allow pixel correspondence matching model 436 to determine pixel correspondences for the training dataset (or another dataset reserved for testing) with at least a threshold level of accuracy (e.g., 75%, 90%, 99%, etc.), as measured by way of one or more loss functions.

V. Example Applications of the Cost Volume Model

Figure 6:
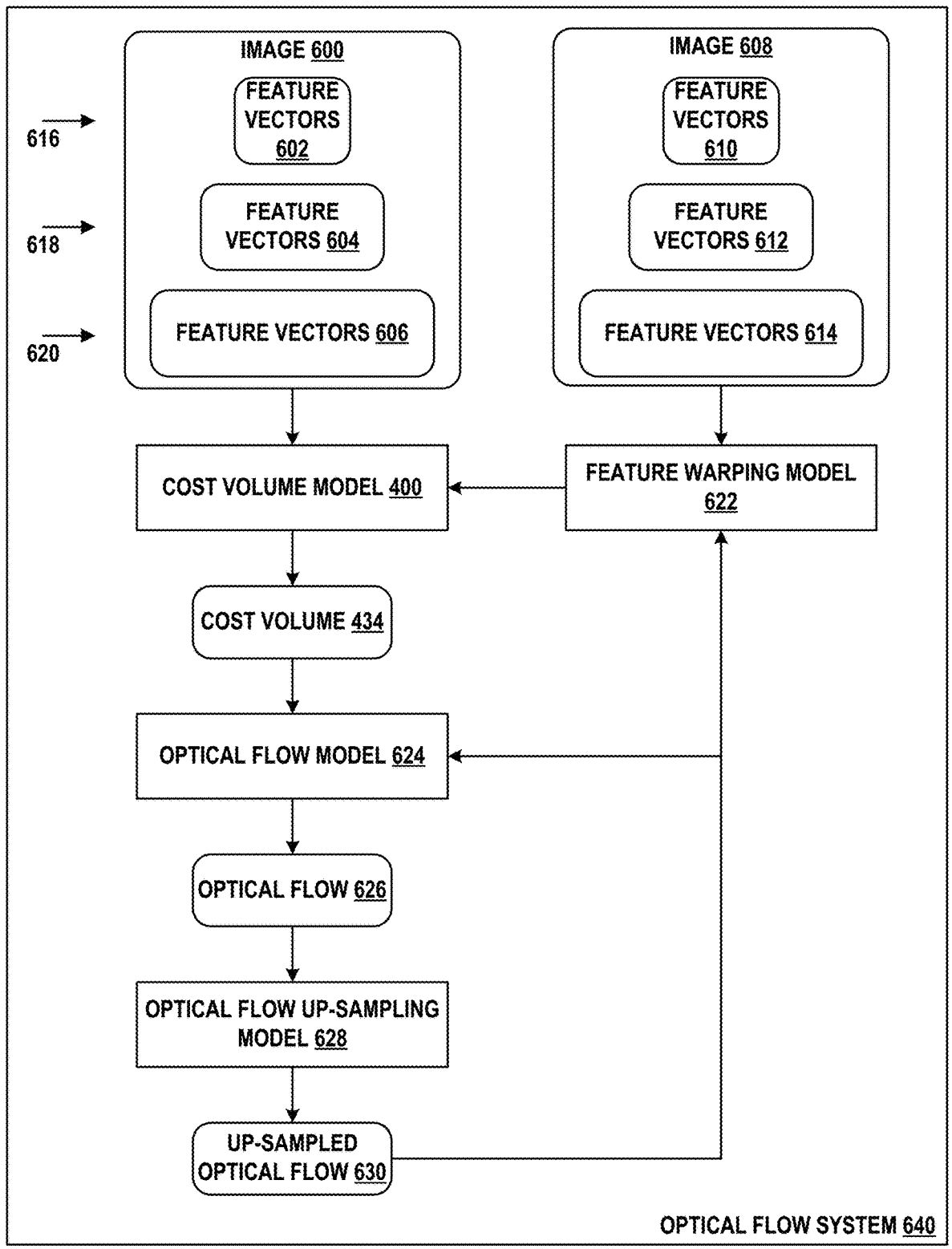
FIG. 6 illustrates a system for determining an optical flow, in accordance with examples described herein.

FIG. 6 illustrates cost volume model 400 implemented as part of optical flow system 640 configured to determine an optical flow between pairs of images. Specifically, optical flow system 640 may be configured to determine an optical flow between image 600 and image 608. Optical flow system 640 may include cost volume model 400, feature warping model 622, optical flow model 624, and optical flow up-sampling model 628. Each of these components of optical flow system 640 may be implemented as hardware components, software components, or a combination of both. Further, each of these components may represent machine learning models, rule-based algorithms, or combinations of both. Thus, in some implementations, cost volume model 400, feature warping model 622, optical flow model 624, and/or optical flow up-sampling model 628 may be jointly trained, allowing cost volume model 400 to learn to generate cost volume 434 such that it is useful to the other components in determining an optical flow.

Images 600 and 608 may each be associated with one or more sets of feature vectors corresponding to one or more size scales. For example, images 600 and 608 may be associated with feature vectors 606 and 614, respectively, corresponding to size scale 620, feature vectors 604 and 612, respectively, corresponding to size scale 618, and feature vectors 602 and 610, respectively, corresponding to size scale 616. Size scale 620 may correspond to full-resolution versions of images 600 and 608 (e.g., 1,879,200 pixels per image), size scale 618 may correspond to half-resolution versions of images 600 and 608 (e.g., 939,600 pixels per image), and size scale 616 may correspond to quarter-resolution versions of images 600 and 608 (e.g., 469,800 pixels per image). Thus, feature vectors 604 may include half the number of feature vectors 606, and feature vectors 602 may include a quarter of the number of feature vectors 606, as indicated by the relative sizing of the corresponding blocks in FIG. 6. Other size scales are possible.

Optical flow system 640 may be configured to process the feature vectors of images 600 and 608 in a pyramidal manner, starting at the lowest resolution size scale 616 and working up to full-resolution size scale 620. Specifically, cost volume 400 may be configured to generate cost volume 434 based on feature vectors 602 and 610. In subsequent iterations corresponding to size scales 618 and 620, the feature vectors of image 608 may be warped by feature warping model 622 based on a previously-determined optical flow. During the first iteration corresponding to size scale 616, feature vectors 610 might not be warped because a previously-determined optical flow might not be available.

Optical flow model 624 may be configured to determine optical flow 626 based on cost volume 434. Optical flow 626 may indicate, for each respective pixel of a plurality of pixels of image 600, a direction and magnitude in which the respective pixel was displaced relative to image 608. Thus, optical flow 626 may comprise a flow field indicative of the apparent movement of the pixels of image 600 between image 600 and image 608. Optical flow model 624 may represent an example implementation of pixel correspondence matching model 436, and/or may include pixel correspondence matching model 436 as a component thereof. Optical flow up-sampling model 628 may be configured to generate up-sampled optical flow 630 based on optical flow 626. Specifically, up-sampled optical flow 630 may correspond to the next higher size scale, that is, to size scale 618.

Feature warping model 622 may be configured to warp feature vectors 612, corresponding to size scale 618, based on up-sampled optical flow 630, which was determined based on feature vectors 602 and 610 at size scale 616. Thus, large-scale flows determined at size scale 616 may be accounted for at size scale 618 by feature warping model 622, allowing the processing at size scale 618 to focus on smaller-scale flows. Thus, in the second iteration corresponding to size scale 618, cost volume model 400 may be configured to generate cost volume 434 based on feature vectors 604 and warped feature vectors 612. Optical flow model 624 may be configured to determine optical flow 626 based on cost volume 434 and up-sampled optical flow 630 determined based on size scale 616, thus accounting for both large-scale flows from size scale 616 and smaller-scale flows from size scale 618. Optical flow up-sampling model 628 may be configured to generate up-sampled optical flow 630 based on optical flow 626 at size scale 618.

Feature warping model 622 may be configured to warp feature vectors 614, corresponding to size scale 620, based on up-sampled optical flow 630 corresponding to size scale 618. Warped feature vectors 614 and feature vectors 606 may be processed by cost volume model 400 to generate cost volume 434 for size scale 620, and optical flow model 624 may generate optical flow 626 based on cost volume 434 corresponding to size scale 620 and up-sampled optical flow 630 from size scale 618. Since optical flow 626 at size scale 620 may correspond to a full resolution of images 600 and 608, optical flow 626 might not be upsampled any further.

By using cost volume model 400 that includes trainable kernel matrix 428, rather than a cost volume model that relies on the Euclidean inner product, the accuracy of optical flow fields generated by optical flow system 640 may be improved. Thus, by improving the accuracy of the optical flow fields, cost volume model 400 may also improve the quality of the outputs of other down-stream tasks, such as video interpolation, video prediction, video segmentation, and/or action recognition, among others, that utilize the determined optical flow field. Cost volume model 400 may additionally or alternatively be used as part of other systems that determine a pixel correspondence between two or more images, such as for the purpose of determining a depth image based on stereoscopic images. In some cases, these other systems may use a pyramidal architecture similar to that of optical flow system 640.

In some implementations, cost volume model 400 may include a corresponding kernel matrix for each size scale. Thus, cost volume model 400 may include a first kernel matrix corresponding to size scale 616, a second kernel matrix corresponding to size scale 618, and a third kernel matrix corresponding to size scale 620. Each of the first, second, and third kernel matrices may be trainable, as discussed above, using corresponding orthogonal and diagonal matrices.

The inclusion of cost volume model 400 in optical flow system 640 may increase the size of optical flow system 640 by an amount dependent on the number and size of the kernel matrices. For example, two 64×64 kernel matrices and three 128×128 kernel matrices may add $2(64^2)+3(128^2)$ =57,344 parameters to the size of optical flow system 640, which may constitute a relatively small increase. An example implementation of optical flow system 640 without cost volume model 400 may include around 41 million parameters, meaning that the addition of cost volume model 400 increases the size of optical flow system 640 by less than 2%.

VI. Example Operations

Figure 7:
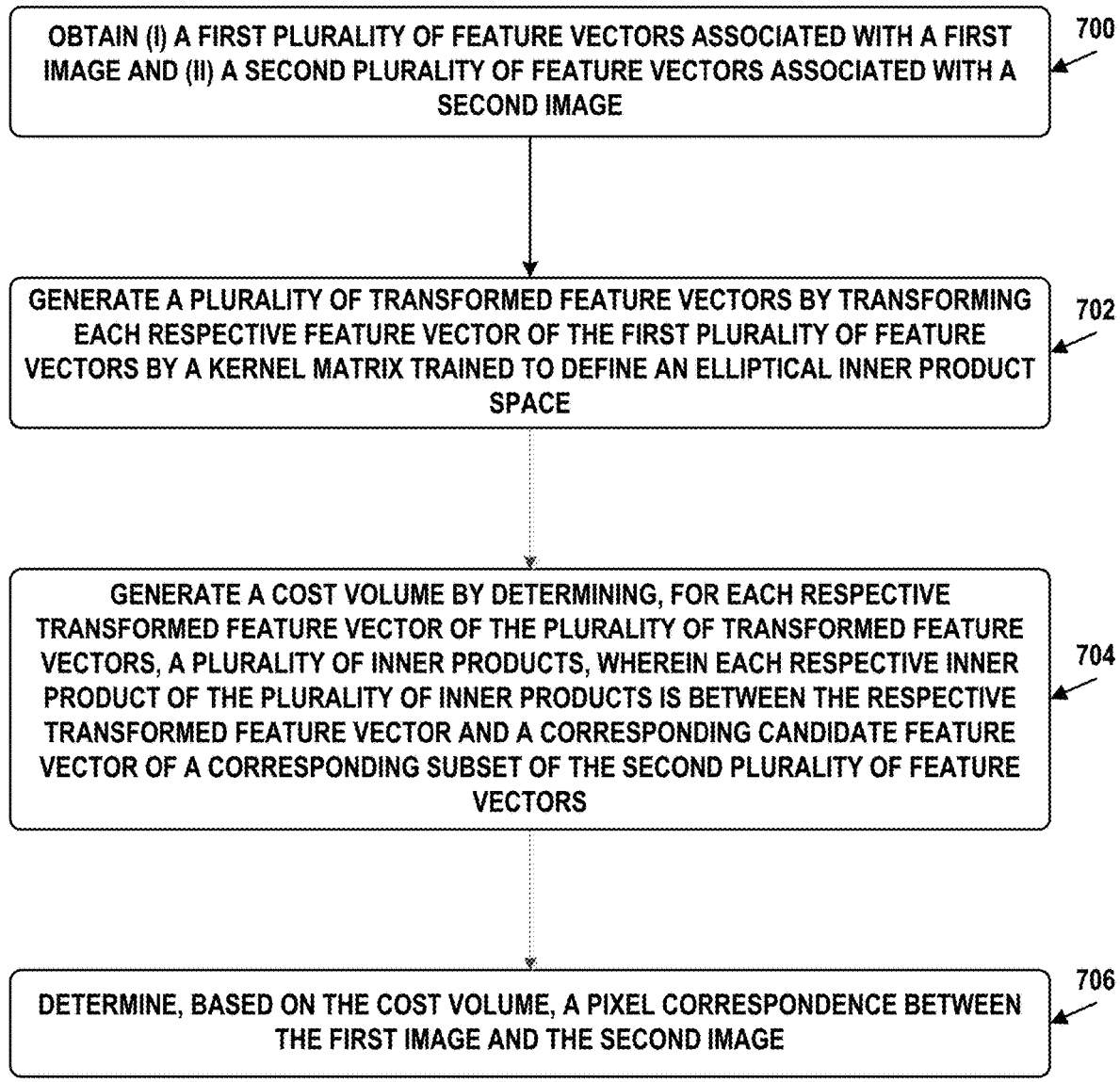
FIG. 7 illustrates a flow diagram, in accordance with examples described herein.

FIG. 7 illustrates a flow chart of operations related to determining a pixel correspondence between two images based on a learnable/trainable cost volume. The operations may be carried out by one or more of computing system 100, computing device 200, cost volume model 400, pixel correspondence matching model 436, and/or optical flow system 640, among other possible types of devices or device subsystems. The examples of FIG. 7 may be simplified by the removal of any one or more of the features shown therein. Further, these examples may be combined with features, aspects, and/or implementations of any of the previous figures or otherwise described herein.

Block 700 may involve obtaining (i) a first plurality of feature vectors associated with a first image and (ii) a second plurality of feature vectors associated with a second image.

Block 702 may involve generating a plurality of transformed feature vectors by transforming each respective feature vector of the first plurality of feature vectors by a kernel matrix trained to define an elliptical inner product space.

Block 704 may involve generating a cost volume by determining, for each respective transformed feature vector of the plurality of transformed feature vectors, a plurality of inner products. Each respective inner product of the plurality of inner products may be between the respective transformed feature vector and a corresponding candidate feature vector of a corresponding subset of the second plurality of feature vectors.

Block 706 may involve determining, based on the cost volume, a pixel correspondence between the first image and the second image.

In some examples, the kernel matrix may be symmetric and positive definite.

In some examples, the kernel matrix may be defined based on a product of (i) a diagonal matrix that includes a plurality of positive diagonal values and (ii) an orthogonal matrix.

In some examples, the kernel matrix may be defined via eigendecomposition by determining (i) a first product between a transpose of the diagonal matrix and the orthogonal matrix, and (ii) a second product between the first product and the diagonal matrix.

In some examples, each respective positive diagonal value of the plurality of positive diagonal values of the diagonal matrix may include a respective weight applied to a corresponding dimension of each respective feature vector of the first plurality of feature vectors. The orthogonal matrix may be configured to apply a rotation to each respective feature vector of the first plurality of feature vectors.

In some examples, each respective positive diagonal value of the plurality of positive diagonal values may be expressed as a function of a corresponding training parameter. The function may map (i) real number values assigned to the corresponding training parameter to (ii) positive real number values. The kernel matrix may be trained to define the elliptical inner product space by iteratively adjusting, for each respective positive diagonal value, a real number value assigned to the corresponding training parameter.

In some examples, the orthogonal matrix may be an element of a subset of a special orthogonal group of matrices. The subset may be selected such that eigenvalues of matrices of the subset exclude negative one.

In some examples, matrices of the subset may be connected. The orthogonal matrix may be expressed using a Cayley representation as a product of: (i) a difference between an identity matrix and a training matrix, and (ii) an inverse of a sum of the identity matrix and the training matrix. The training matrix may be skew-symmetric. The kernel matrix may be trained to define the elliptical inner product space by initializing the training matrix as the identity matrix and iteratively adjusting values of the training matrix.

In some examples, the orthogonal matrix may be an element of a Stiefel matrix manifold that includes a plurality of square orthonormal matrices. The kernel matrix may be trained to define the elliptical inner product space by a Riemann gradient descent that includes determining a projection of a gradient from the Stiefel matrix manifold to a tangent space at the orthogonal matrix, adjusting values of the orthogonal matrix based on the projection of the gradient, and determining a retraction of the orthogonal matrix as adjusted into the Stiefel matrix.

In some examples, each respective feature vector of the first plurality of feature vectors may be associated with a corresponding pixel of the first image. Each respective feature vector of the second plurality of feature vectors may be associated with a corresponding pixel of the second image.

In some examples, for a respective transformed feature vector associated with a corresponding pixel located at a particular pixel position within the first image, the corresponding subset of the second plurality of feature vectors may be associated with a plurality of pixels located within a search window that includes the particular pixel position within the second image.

In some examples, the first image and the second image may each represent an environment. Determining the pixel correspondence between the first image and the second image may include determining, based on the cost volume and for each respective pixel of a plurality of pixels in the first image, a corresponding pixel in the second image determined to represent a same portion of the environment as the respective pixel.

In some examples, the first image may represent the environment at a first time and the second image may represent the environment at a second time. Determining the pixel correspondence between the first image and the second image may include determining, by way of one or more machine learning models, an optical flow between the first image and the second image based on the cost volume.

In some examples, the first image and the second image may be stereoscopic images of the environment. Determining the pixel correspondence between the first image and the second image may include determining, by way of one or more machine learning models, a depth image based on the cost volume.

In some examples, obtaining the first plurality of feature vectors and the second plurality of feature vectors may include generating the first plurality of feature vectors by processing the first image by one or more machine learning models and generating the second plurality of feature vectors by processing the second image by the one or more machine learning models.

In some examples, the first plurality of feature vectors and the second plurality of feature vectors may correspond to a first size scale of the first image and the second image. A third plurality of feature vectors associated with the first image and a fourth plurality of feature vectors associated with the second image may be obtained. The third plurality of feature vectors and the fourth plurality of feature vectors may correspond to a second size scale of the first image and the second image. The second size scale may be larger than the first size scale. The fourth plurality of feature vectors may be warped based on the pixel correspondence between the first image and the second image at the first size scale. A second plurality of transformed feature vectors may be generated by transforming each respective feature vector of the third plurality of feature vectors by the kernel matrix. A second cost volume may be generated by determining, for each respective transformed feature vector of the second plurality of transformed feature vectors, a second plurality of inner products. Each respective inner product of the second plurality of inner products may be between the respective transformed feature vector of the second plurality of transformed feature vectors and a corresponding candidate feature vector of a corresponding subset of the fourth plurality of feature vectors as warped. Based on the second cost volume, a second pixel correspondence may be determined between the first image and the second image at the second size scale.

VII. Example Operations

FIGS. 8A and 8B illustrate test results of various optical flow models/methods executed against commonly-used benchmark datasets. Specifically, FIG. 8A illustrates test results for various supervised models/methods executed against the Sintel benchmark dataset, which includes a Clean pass portion and a Final pass portion, and KITTI 2015 benchmark dataset. Additional details of the Sintel benchmark dataset are provided in the paper titled "A Naturalistic Open Source Movie for Optical Flow Evaluation," authored by Daniel J. Butler, Jonas Wulff, Garrett B. Stanley, and Michael J. Black, and published by the European Conference on Computer Vision 2012. Additional details of the KITTI 2015 benchmark dataset are provided in the paper titled "Are we ready for Autonomous Driving? The KITTI Vision Benchmark Suite," authored by Andreas Geiger, Philip Lenz, and Raquel Urtasun, and published by the Conference on Computer Vision and Pattern Recognition 2012.

FIG. 8B illustrates test results for various unsupervised models executed against the KITTI 2015 benchmark dataset. Both benchmark datasets include a training subset, which may be reserved for model training, and a testing subset, which may be reserved for model testing. In each of FIGS. 8A and 8B, results of the best-performing model with respect to each metric are indicated by the darkened pattern of the corresponding table cell.

The supervised models illustrated in FIG. 8A include FlowNet2, DCFlow, MirrorFlow, SpyNet, LiteFlowNet, PWC-Net, PWC-Net+, IRR-PWC, HD$^3$, and VCN, each of which is detailed in a corresponding published paper. For example, details of the VCN model are provided in the paper titled "Volumetric Correspondence Networks for Optical Flow," authored by Gengshan Yang and Deva Ramanan, and published by the Conference on Neural Information Processing Systems 2019. The addition of "-ft" after the name of a model indicates a version of the model that has undergone additional "fine tuning" training on the Sintel and/or KITTI 2015 benchmark dataset. Unless otherwise indicated, the reported numbers in FIG. 8A indicate the average endpoint error (AEPE), which measures the average across all image pixels of a per-pixel difference between the estimated optical flow and a ground-truth optical flow. "Fl-all" indicates the percentage of outliers (e.g., >5% end point error) averaged over all ground-truth pixels (e.g., both background and foreground pixels). "(–)" indicates that a particular test result is not available.

Each of the models reported in FIG. 8A utilizes the Euclidean cost volume model or another predetermined (e.g., non-learnable or non-trainable) cost volume model. Thus, the cost volume model in each of these supervised optical flow models may be replaced by trainable/learnable cost volume model 400 to improve the performance of the supervised optical flow models. Accordingly, the bottommost row of FIG. 8A corresponds to the VCN model paired with cost volume model 400 (i.e., VCN+LCV). In four out of the seven tests (i.e., Sintel final test and all KITTI 2015 tests), VCN+LCV scores higher than all the other reported supervised optical flow models. Further, as can be seen from a comparison of the bottommost row to the row above it, the addition of cost volume model 400 to the VCN optical flow model improves the performance of the VCN optical flow model with respect to all but the Sintel clean test.

The unsupervised models illustrated in FIG. 8B include DSTFlow, GeoNet, UnFlow, DF-Net, OccAwareFlow, Back2FutureFlow, SelFlow, and DDFlow, each of which is detailed in a corresponding published paper. The AEPE and Fl-all metrics are the same as defined above. "Fl-bg" indicates the percentage of outliers (e.g., >5% end point error) averaged over background ground-truth pixels. "Fl-fg" indicates the percentage of outliers (e.g., >5% end point error) averaged over foreground ground-truth pixels.

Each of the models reported in FIG. 8B utilizes the Euclidean cost volume model or another predetermined (e.g., non-learnable or non-trainable) cost volume model. Thus, the cost volume model in each of these unsupervised optical flow models may be replaced by trainable/learnable cost volume model 400 to improve the performance of the unsupervised optical flow models. Accordingly, the bottommost row of FIG. 8B corresponds to the DDFlow model paired with cost volume model 400 (i.e., DDFlow+LCV). In two out of the four metrics (i.e., KITTI 2015 test Fl-fg and Fl-all), DDFlow+LCV scores higher than all the other reported unsupervised optical flow models, including SelFlow, which is an improved version of DDFlow. Further, as can be seen from a comparison of the bottommost row to the row above it, the addition of cost volume model 400 to the DDFlow optical flow model improves the performance of the DDFlow optical flow model with respect to all metrics.

Adding cost volume model 400 to any of the other reported supervised and/or unsupervised optical flow models may further improve the performance of these optical flow models. For example, cost volume model 400 may allow the optical flow models to operate more robustly under varied illumination conditions, in the presence of noise (e.g., natural or artificially-added noise), and in the presence of artificially-added adversarial patches. In some implementations, an untrained version of cost volume model 400 (e.g., where the kernel matrix W is initialized as the identity matrix) may be added to a pre-trained implementation of an optical flow model. Cost volume model 400 and the pre-trained optical flow model may then undergo further training to fine-tune cost volume model 400 to cooperate with the optical flow model. Such further training may result in modifications to cost volume model 400 and/or the pre-trained optical flow model, resulting in a system that determines more accurate optical flow fields than the unmodified pre-trained optical flow model operating without cost volume model 400.

VIII. Conclusion

The present disclosure is not to be limited in terms of the particular examples described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The examples described herein and in the figures are not meant to be limiting. Other examples can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with examples. Alternative examples are included within the scope of these examples. In these alternative examples, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other examples can include more or less of each element shown in a given figure. Further, some of the illustrated elements can be combined or omitted. Yet further, an example can include elements that are not illustrated in the figures.

While various aspects and examples have been disclosed herein, other aspects and examples will be apparent to those skilled in the art. The various aspects and examples disclosed herein are for purpose of illustration and are not intended to be limiting, with the true scope being indicated by the following claims.

What is claimed is:

1. A computer-implemented method comprising:
    obtaining (i) a first plurality of feature vectors associated with a first image and (ii) a second plurality of feature vectors associated with a second image;
    generating a plurality of transformed feature vectors by transforming each respective feature vector of the first plurality of feature vectors by a kernel matrix trained to define an elliptical inner product space;
    generating a cost volume by determining, for each respective transformed feature vector of the plurality of transformed feature vectors, a plurality of inner products, wherein each respective inner product of the plurality of inner products is between the respective transformed feature vector and a corresponding candidate feature vector of a corresponding subset of the second plurality of feature vectors; and
    determining, based on the cost volume, a pixel correspondence between the first image and the second image.

2. The computer-implemented method of claim 1, wherein the kernel matrix is symmetric and positive definite.

3. The computer-implemented method of claim 1, wherein the kernel matrix is defined based on a product of (i) a diagonal matrix comprising a plurality of positive diagonal values and (ii) an orthogonal matrix.

4. The computer-implemented method of claim 3, wherein the kernel matrix is defined via eigendecomposition by determining (i) a first product between a transpose of the diagonal matrix and the orthogonal matrix, and (ii) a second product between the first product and the diagonal matrix.

5. The computer-implemented method of claim 3, wherein each respective positive diagonal value of the plurality of positive diagonal values of the diagonal matrix comprises a respective weight applied to a corresponding dimension of each respective feature vector of the first plurality of feature vectors, and wherein the orthogonal matrix is configured to apply a rotation to each respective feature vector of the first plurality of feature vectors.

6. The computer-implemented method of claim 3, wherein each respective positive diagonal value of the plurality of positive diagonal values is expressed as a function of a corresponding training parameter, wherein the function maps (i) real number values assigned to the corresponding training parameter to (ii) positive real number values, and wherein the kernel matrix is trained to define the elliptical inner product space by iteratively adjusting, for each respective positive diagonal value, a real number value assigned to the corresponding training parameter.

7. The computer-implemented method of claim 3, wherein the orthogonal matrix is an element of a subset of a special orthogonal group of matrices, wherein the subset is selected such that eigenvalues of matrices of the subset exclude negative one.

8. The computer-implemented method of claim 7, wherein matrices of the subset are connected, wherein the orthogonal matrix is expressed using a Cayley representation as a product of: (i) a difference between an identity matrix and a training matrix, and (ii) an inverse of a sum of the identity matrix and the training matrix, wherein the training matrix is skew-symmetric, wherein the kernel matrix is trained to define the elliptical inner product space by initializing the training matrix as the identity matrix and iteratively adjusting values of the training matrix.

9. The computer-implemented method of claim 3, wherein the orthogonal matrix is an element of a Stiefel matrix manifold comprising a plurality of square orthonormal matrices, and wherein the kernel matrix is trained to define the elliptical inner product space by a Riemann gradient descent comprising:
 determining a projection of a gradient from the Stiefel matrix manifold to a tangent space at the orthogonal matrix;
 adjusting values of the orthogonal matrix based on the projection of the gradient; and
 determining a retraction of the orthogonal matrix as adjusted into the Stiefel matrix manifold.

10. The computer-implemented method of claim 1, wherein each respective feature vector of the first plurality of feature vectors is associated with a corresponding pixel of the first image, wherein each respective feature vector of the second plurality of feature vectors is associated with a corresponding pixel of the second image.

11. The computer-implemented method of claim 10, wherein, for a respective transformed feature vector associated with a corresponding pixel located at a particular pixel position within the first image, the corresponding subset of the second plurality of feature vectors is associated with a plurality of pixels located within a search window that includes the particular pixel position within the second image.

12. The computer-implemented method of claim 1, wherein the first image and the second image each represent an environment, and wherein determining the pixel correspondence between the first image and the second image comprises:
 determining, based on the cost volume and for each respective pixel of a plurality of pixels in the first image, a corresponding pixel in the second image determined to represent a same portion of the environment as the respective pixel.

13. The computer-implemented method of claim 12, wherein the first image represents the environment at a first time, wherein the second image represents the environment at a second time, and wherein determining the pixel correspondence between the first image and the second image comprises:
 determining, by way of one or more machine learning models, an optical flow between the first image and the second image based on the cost volume.

14. The computer-implemented method of claim 12, wherein the first image and the second image are stereoscopic images of the environment, and wherein determining the pixel correspondence between the first image and the second image comprises:
 determining, by way of one or more machine learning models, a depth image based on the cost volume.

15. The computer-implemented method of claim 1, wherein obtaining the first plurality of feature vectors and the second plurality of feature vectors comprises:
 generating the first plurality of feature vectors by processing the first image by one or more machine learning models; and
 generating the second plurality of feature vectors by processing the second image by the one or more machine learning models.

16. The computer-implemented method of claim 1, wherein the first plurality of feature vectors and the second plurality of feature vectors correspond to a first size scale of the first image and the second image, and wherein the method further comprises:
 obtaining (i) a third plurality of feature vectors associated with the first image and (ii) a fourth plurality of feature vectors associated with the second image, wherein the third plurality of feature vectors and the fourth plurality of feature vectors correspond to a second size scale of the first image and the second image, wherein the second size scale is larger than the first size scale;
 warping the fourth plurality of feature vectors based on the pixel correspondence between the first image and the second image at the first size scale;
 generating a second plurality of transformed feature vectors by transforming each respective feature vector of the third plurality of feature vectors by the kernel matrix;
 generating a second cost volume by determining, for each respective transformed feature vector of the second plurality of transformed feature vectors, a second plurality of inner products, wherein each respective inner product of the second plurality of inner products is between the respective transformed feature vector of the second plurality of transformed feature vectors and a corresponding candidate feature vector of a corresponding subset of the fourth plurality of feature vectors as warped; and
 determining, based on the second cost volume, a second pixel correspondence between the first image and the second image at the second size scale.

17. A system comprising:
 a processor; and
 a non-transitory computer-readable storage medium having stored thereon instructions that, when executed by the processor, cause the processor to perform operations comprising:
  obtaining (i) a first plurality of feature vectors associated with a first image and (ii) a second plurality of feature vectors associated with a second image;
  generating a plurality of transformed feature vectors by transforming each respective feature vector of the first plurality of feature vectors by a kernel matrix trained to define an elliptical inner product space;
  generating a cost volume by determining, for each respective transformed feature vector of the plurality of transformed feature vectors, a plurality of inner products, wherein each respective inner product of the plurality of inner products is between the respective transformed feature vector and a corresponding candidate feature vector of a corresponding subset of the second plurality of feature vectors; and determining, based on the cost volume, a pixel correspondence between the first image and the second image.

18. The system of claim 17, wherein the kernel matrix is defined based on a product of (i) a diagonal matrix comprising a plurality of positive diagonal values and (ii) an orthogonal matrix, wherein each respective positive diagonal value of the plurality of positive diagonal values is expressed as a function of a corresponding training parameter, wherein the function maps (i) real number values assigned to the corresponding training parameter to (ii) positive real number values, and wherein the kernel matrix is trained to define the elliptical inner product space by iteratively adjusting, for each respective positive diagonal value, a real number value assigned to the corresponding training parameter.

19. The system of claim 17, wherein the kernel matrix is defined based on a product of (i) a diagonal matrix comprising a plurality of positive diagonal values and (ii) an orthogonal matrix comprising an element of a subset of a special orthogonal group of matrices, wherein the subset is selected such that eigenvalues of matrices of the subset exclude negative one, wherein matrices of the subset are connected, wherein the orthogonal matrix is expressed using a Cayley representation as a product of: (i) a difference between an identity matrix and a training matrix, and (ii) an inverse of a sum of the identity matrix and the training matrix, wherein the training matrix is skew-symmetric, wherein the kernel matrix is trained to define the elliptical inner product space by initializing the training matrix as the identity matrix and iteratively adjusting values of the training matrix.

20. A non-transitory computer-readable storage medium having stored thereon instructions that, when executed by a computing system, cause the computing system to perform operations comprising:
  obtaining (i) a first plurality of feature vectors associated with a first image and (ii) a second plurality of feature vectors associated with a second image;
  generating a plurality of transformed feature vectors by transforming each respective feature vector of the first plurality of feature vectors by a kernel matrix trained to define an elliptical inner product space;
  generating a cost volume by determining, for each respective transformed feature vector of the plurality of transformed feature vectors, a plurality of inner products, wherein each respective inner product of the plurality of inner products is between the respective transformed feature vector and a corresponding candidate feature vector of a corresponding subset of the second plurality of feature vectors; and
  determining, based on the cost volume, a pixel correspondence between the first image and the second image.

* * * * *